(12) United States Patent
Wang et al.

(10) Patent No.: US 11,895,243 B2
(45) Date of Patent: Feb. 6, 2024

(54) SYSTEMS AND METHODS FOR DATA TRANSFER AND STORAGE

(71) Applicant: BEIJING VOYAGER TECHNOLOGY CO., LTD., Beijing (CN)

(72) Inventors: Hua Wang, Beijing (CN); Fenglei Wang, Beijing (CN); Yubo Huang, Beijing (CN)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 478 days.

(21) Appl. No.: 17/349,962

(22) Filed: Jun. 17, 2021

(65) Prior Publication Data

US 2021/0320804 A1  Oct. 14, 2021

Related U.S. Application Data

(63) Continuation of application No. PCT/CN2019/071128, filed on Jan. 10, 2019.

(30) Foreign Application Priority Data

Dec. 29, 2018 (CN) .......................... 201811654157.0

(51) Int. Cl.
*H04L 9/32* (2006.01)
*H04L 9/08* (2006.01)
*H04L 9/40* (2022.01)

(52) U.S. Cl.
CPC .......... *H04L 9/3242* (2013.01); *H04L 9/0894* (2013.01); *H04L 63/0428* (2013.01); *H04L 63/123* (2013.01); *H04L 2209/84* (2013.01)

(58) Field of Classification Search
CPC . H04L 9/3242; H04L 9/0894; H04L 63/0428; H04L 63/123
(Continued)

(56) References Cited

U.S. PATENT DOCUMENTS

| 7,136,487 B1 * | 11/2006 | Schon ................... G06Q 50/16 713/184 |
| 7,167,982 B2 | 1/2007 | Elliott et al. |

(Continued)

FOREIGN PATENT DOCUMENTS

| CN | 101118508 A | 2/2008 |
| CN | 103413101 A | 11/2013 |

(Continued)

OTHER PUBLICATIONS

International Search Report in PCT/CN2019/071128 dated Oct. 9, 2019, 4 pages.

(Continued)

*Primary Examiner* — Teshome Hailu
(74) *Attorney, Agent, or Firm* — METIS IP LLC

(57) ABSTRACT

A method for data transfer and storage is provided. The method may include: encrypting data generated by a terminal device; storing duplicated copies of the encrypted data respectively in a first storage device and a second storage device, which are removably inserted into the terminal device; generating, with the terminal device, a message authentication code associated with the encrypted data; transmitting the message authentication code to a first server; physically transporting the first storage device to a remote location of the first server, and upon the first storage device being inserted into the first server, determining whether the encrypted data stored in the first storage device are damaged using the message authentication code; and in response to a determination that the encrypted data stored in (Continued)

the first storage device are not damaged, transmitting the encrypted data from the first storage device to the first server.

17 Claims, 10 Drawing Sheets

(58) Field of Classification Search
USPC .......................................................... 713/181
See application file for complete search history.

(56) References Cited

U.S. PATENT DOCUMENTS

| | | | | |
|---|---|---|---|---|
| 9,009,805 | B1* | 4/2015 | Kirkby | ............... H04N 21/4622 |
| | | | | 709/224 |
| 11,381,402 | B2* | 7/2022 | Hergesheimer | ....... H04L 63/166 |
| 2005/0210270 | A1* | 9/2005 | Rohatgi | .................. G06F 21/32 |
| | | | | 713/186 |
| 2010/0199042 | A1 | 8/2010 | Bates et al. | |
| 2020/0100108 | A1* | 3/2020 | Everson | ................ H04L 9/0825 |
| 2021/0351923 | A1* | 11/2021 | Nix | ....................... H04W 12/06 |

FOREIGN PATENT DOCUMENTS

| CN | 107193679 A | 9/2017 |
|---|---|---|
| WO | 2017106628 A1 | 6/2017 |

OTHER PUBLICATIONS

Written Opinion in PCT/CN2019/071128 dated Oct. 9, 2019, 4 pages.
First Office Action in Chinese Application No. 201811654157.0 dated Jan. 21, 2021, 21 pages.

* cited by examiner

SYSTEMS AND METHODS FOR DATA TRANSFER AND STORAGE

CROSS-REFERENCE TO RELATED APPLICATIONS

This application is a Continuation of International Application No. PCT/CN2019/071128, filed on Jan. 10, 2019, which claims priority to Chinese Patent Application No. 201811654157.0, filed on Dec. 29, 2018, the contents of each of which are incorporated herein by reference.

TECHNICAL FIELD

The present disclosure generally relates to information technology, and in particular, to systems and methods for data transfer and storage.

BACKGROUND

Data transfer and storage technologies are widely used in various fields. For example, in a system for the testing of autonomous driving, an autonomous vehicle (e.g., an unmanned robot) can generate a large amount of data (e.g., bag files) every day. It would be crucial, therefore, to store and transfer such data not only for security purposes but also that researchers can access and analyze the data timely and efficiently. In addition, it would be preferable to save resources in the process. In some cases, a data transfer and storage system can collect the data generated by autonomous driving testing and upload it to a database (e.g., a Hadoop Distributed File System (HDFS)) and/or a data management system. A user (e.g., an engineer) may retrieve and/or download the data from the database or the data management system for further analysis. In-depth exploration of autonomous driving relies on fast transfer and secure storage of the data. Therefore, it is desirable to provide methods and systems for transferring and storing data securely, efficiently, and without waste of resources.

SUMMARY

According to one aspect of the present disclosure, a method for data transfer and storage is provided. The method may include: encrypting data generated by a terminal device; storing duplicated copies of the encrypted data respectively in a first storage device and a second storage device, which are removably inserted into the terminal device; generating, with the terminal device, a message authentication code associated with the encrypted data; transmitting the message authentication code to a first server; physically transporting the first storage device to a remote location of the first server, and upon the first storage device being inserted into the first server, determining whether the encrypted data stored in the first storage device are damaged using the message authentication code; and in response to a determination that the encrypted data stored in the first storage device are not damaged, transmitting the encrypted data from the first storage device to the first server.

In some embodiments, the method may further include: decrypting the first storage device before determining whether the encrypted data stored in the first storage device are damaged.

In some embodiments, the method may further include initializing the first storage device and the second storage device. The initializing may include: encrypting the first storage device and the second storage device; configuring the first storage device and second storage device with a Redundant Array of Independent Disks (RAID) storage arrangement; and generating two identification labels respectively associated with serial numbers of the first storage device and second storage device.

In some embodiments, the method may further include: generating one or more metafiles associated with the encrypted data.

In some embodiments, the method may further include: automatically generating a first transportation service request for transporting the first storage device to the remote location of the first server.

In some embodiments, the method may further include: automatically generating a second transportation service request for transporting the first storage device from the remote location of the first server to a location of the terminal device. Generating the second transportation service request may be triggered by complete transmission of the encrypted data to the first server.

In some embodiments, the method may further include: sending a message to inform an operator to remove the first storage device from the first server.

In some embodiments, the method may further include: after complete transmission of the encrypted data from the first storage device to the first server, resetting the first storage device and the second storage device with a second server.

In some embodiments, the method may further include: after complete transmission of the encrypted data from the first storage device to the first server, verifying whether the encrypted data are transmitted without flaw based on the message authentication code.

In some embodiments, the message authentication code may include a Message Digest 5 (MD5) code.

In some embodiments, the terminal device may be an unmanned robot.

According to another aspect of the present disclosure, a method for data transfer and storage is provided. The method may include: storing duplicated copies of data generated by a terminal device respectively in a first storage device and a second storage device, which are removably inserted into the terminal device; physically transporting the first storage device to a remote location of a first server, and upon the first storage device being inserted into the first server, decrypting the first storage device; determining whether the data stored in the first storage device are damaged; and in response to a determination that the data stored in the first storage device are not damaged, transmitting the data from the first storage device to the first server.

In some embodiments, the method may further include: initializing the first storage device and the second storage device. The initializing may include: encrypting the first storage device and the second storage device; configuring the first storage device and second storage device with a Redundant Array of Independent Disks (RAID) storage arrangement; and generating two identification labels respectively associated with serial numbers of the first storage device and second storage device.

In some embodiments, the method may further include: automatically generating a first transportation service request for transporting the first storage device to the remote location of the first server.

In some embodiments, the method may further include: automatically generating a second transportation service request for transporting the first storage device from the remote location of the first server to a location of the terminal device.

In some embodiments, generating the second transportation service request may be triggered by complete transmission of the data to the first server.

According to another aspect of the present disclosure, a system for data transfer and storage is provided. The system may include: a first server and a terminal device. The terminal device may include at least one device processor, wherein when executing a set of device instructions, the at least one device processor may be directed to: encrypt data generated by the terminal device; store duplicated copies of the encrypted data respectively in a first storage device and a second storage device, which are removably inserted into the terminal device; generate a message authentication code associated with the encrypted data; and transmit the message authentication code to the first server. The first server may include at least one first server processor, wherein when executing a set of first server instructions, the at least one first server processor may be directed to: determine whether the encrypted data stored in the first storage device are damaged using the message authentication code, wherein the first storage device may be physically transported to a remote location of the first server and inserted into the first server; and in response to a determination that the encrypted data stored in the first storage device are not damaged, transmit the encrypted data from the first storage device to the first server.

In some embodiments, the at least one first server processor may be further directed to: decrypt the first storage device before determining whether the encrypted data stored in the first storage device are damaged.

In some embodiments, the at least one first server processor may be further directed to initialize the first storage device and the second storage device, or the system may further include a second server, the second server including at least one second server processor. When executing a set of second server instructions, the at least one second server processor may be directed to initialize the first storage device and the second storage device. To initialize the first storage device and the second storage device, the at least one first server processor or the at least one second server processor may be further directed to: encrypt the first storage device and the second storage device; configure the first storage device and second storage device with a Redundant Array of Independent Disks (RAID) storage arrangement; and generate two identification labels respectively associated with serial numbers of the first storage device and second storage device.

In some embodiments, the at least one first server processor may be further directed to: generate one or more metafiles associated with the encrypted data.

In some embodiments, the at least one device processor may be further directed to: automatically generate a first transportation service request for transporting the first storage device to the remote location of the first server.

In some embodiments, the at least one first server processor may be further directed to: automatically generate a second transportation service request for transporting the first storage device from the remote location of the first server to a location of the terminal device, wherein generating the second transportation service request may be triggered by complete transmission of the encrypted data to the first server.

In some embodiments, the at least one first server processor may be further directed to: send a message to inform an operator to remove the first storage device from the first server.

In some embodiments, the at least one second server processor may be further directed to: after complete transmission of the encrypted data from the first storage device to the first server, reset the first storage device and the second storage device.

In some embodiments, the at least one first server processor may be further directed to: after complete transmission of the encrypted data from the first storage device to the first server, verify whether the encrypted data are transmitted without flaw based on the message authentication code.

In some embodiments, the message authentication code may include a Message Digest 5 (MD5) code.

In some embodiments, the terminal device may be an unmanned robot.

According to another aspect of the present disclosure, a system for data transfer and storage is provided. The system may include: a first server and a terminal device. The terminal device may include at least one device processor, wherein when executing a set of device instructions, the at least one device processor may be directed to: store duplicated copies of data generated by a terminal device respectively in a first storage device and a second storage device, which are removably inserted into the terminal device. The first server may include at least one first server processor, wherein when executing a set of first server instructions, the at least one first server processor may be directed to: decrypt the first storage device; determine whether the data stored in the first storage device are damaged, wherein the first storage device may be physically transported to a remote location of a first server and inserted into the first server; and in response to a determination that the data stored in the first storage device are not damaged, transmit the data from the first storage device to the first server.

In some embodiments, the at least one first server processor may be further directed to initialize the first storage device and the second storage device, or the system may further include a second server, the second server including at least one second server processor, wherein when executing a set of second server instructions, the at least one second server processor may be directed to initialize the first storage device and the second storage device. To initialize the first storage device and the second storage device, the at least one first server processor or the at least one second server processor may be further directed to: encrypt the first storage device and the second storage device; configure the first storage device and second storage device with a Redundant Array of Independent Disks (RAID) storage arrangement; and generate two identification labels respectively associated with serial numbers of the first storage device and second storage device.

In some embodiments, the at least one device processor may be further directed to: automatically generate a first transportation service request for transporting the first storage device to the remote location of the first server.

In some embodiments, the at least one first server processor may be further directed to: automatically generate a second transportation service request for transporting the first storage device from the remote location of the first server to a location of the terminal device.

In some embodiments, generating the second transportation service request may be triggered by complete transmission of the data to the first server.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
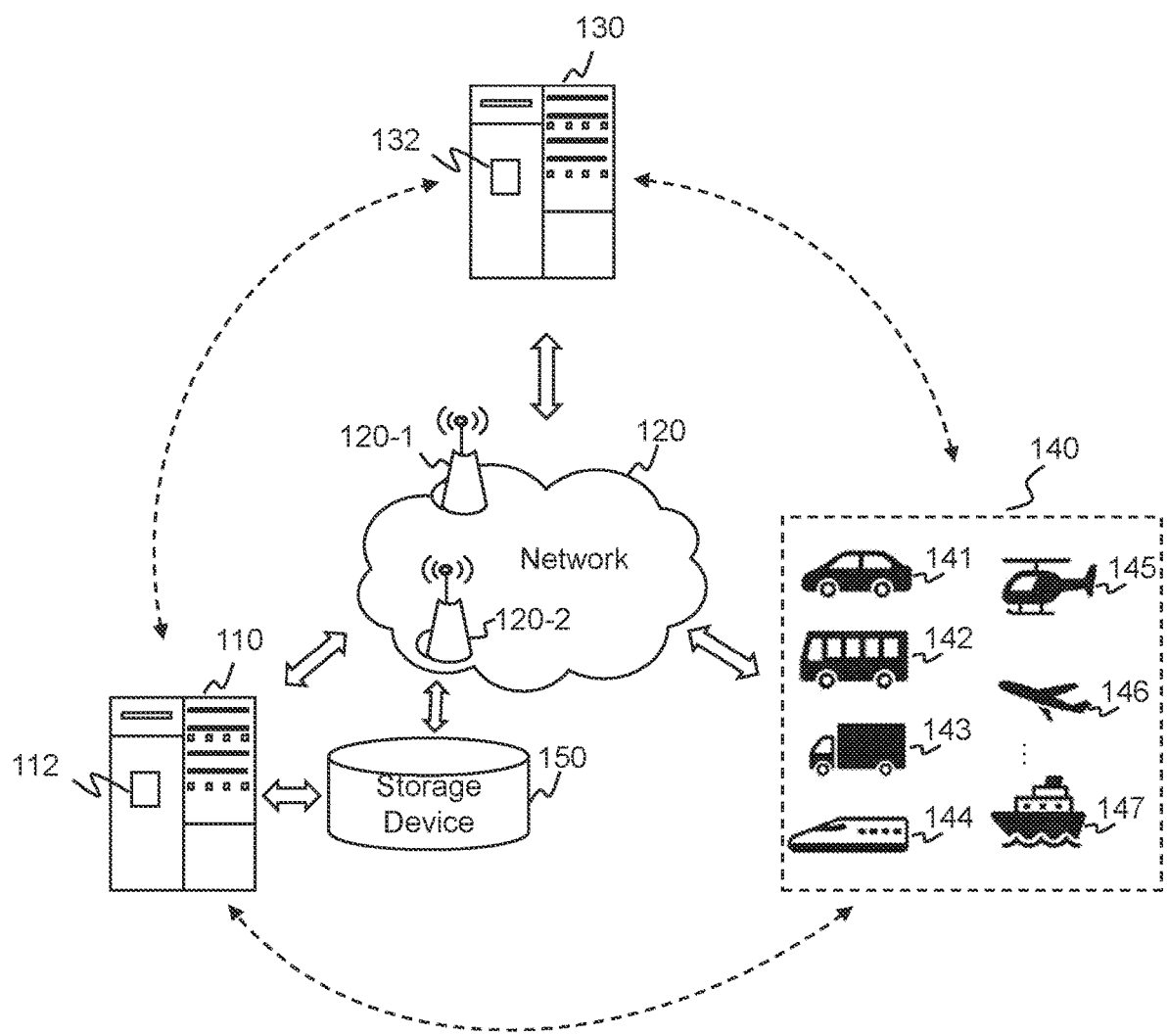
FIG. 1 is a schematic diagram illustrating an exemplary data transfer and storage system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding a transportation system in land, it should be understood that this is only one exemplary embodiment. The systems and methods of the present disclosure may be applied to any other kind of transportation system. For example, the systems and methods of the present disclosure may be applied to transportation systems of different environments including ocean, aerospace, or the Ike, or any combination thereof. The vehicle of the transportation systems may include a car, a bus, a train, a subway, a vessel, an aircraft, a spaceship, a hot-air balloon, or the like, or any combination thereof.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for data transfer and storage. According to some systems and methods of the present disclosure, a terminal device (e.g., an unmanned robot) may encrypt data generated by the terminal device; store duplicated copies of the encrypted data respectively in a first storage device and a second storage device, which are removably inserted into the terminal device; generate a message authentication code associated with the encrypted data; and transmit the message authentication code to a first server. Furthermore, according to some systems and methods of the present disclosure, the first server may determine whether the encrypted data stored in the first storage device are damaged using the message authentication code, wherein the first storage device is physically transported to a remote location of the first server and inserted into the first server; and in response to a determination that the encrypted data stored in the first storage device are not damaged, transmit the encrypted data from the first storage device to the first server. According to the systems and methods of the present disclosure, the data generated by the terminal device may be transferred to the first server quickly and securely, which may improve the efficiency and security of data transmission and storage.

FIG. 1 is a schematic diagram illustrating an exemplary data transfer and storage system according to some embodiments of the present disclosure. In some embodiments, the data transfer and storage system 100 may include a first server 110, a network 120, a second server 130, a terminal device 140, and a storage device 1501. The components in the data transfer and storage system 100 may be connected in one or more of various ways. Merely by way of example, the first server 110 and/or the second server 130 may be connected to at least a portion of the terminal device 140 through the network 1201. As another example, the first server 110 and/or the second server 130 may be connected to at least a portion of the terminal device 140 directly as indicated by the bi-directional arrow in dotted lines linking the first server 110 (or the second server 130) and the terminal device 1401. As still another example, the storage device 150 may be connected to the first server 110 directly or through the network 120. As still another example, the first server 110 may be connected to the second server 130 directly (as indicated by the bi-directional arrow in dotted lines linking the first server 110 and the second server 130) or through the network 120.

In some embodiments, the first server 110 may be a single server or a server group. The server group may be centralized or distributed (e.g., the first server 110 may be a distributed system). In some embodiments, the first server 110 may be local or remote. For example, the first server 110 may access information and/or data stored in the second server 130, the terminal device 140 and/or the storage device 150 via the network 1201. As another example, the first server 110 may be directly connected to the second server 130, the terminal device 140 and/or the storage device 150 to access stored information and/or data. In some embodiments, the first server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the first server 110 may be implemented on a computing device 200 including one or more components illustrated in FIG. 2 in the present disclosure.

In some embodiments, the first server 110 may include at least one processing device 112. The processing device 112 (also referred to as a first server processor) may process information and/or data generated by the terminal device 140 to perform one or more functions described in the present disclosure. For example, the processing device 112 may decrypt a first storage device upon the first storage device being inserted into the first server 110. As another example, the processing device 112 may determine whether encrypted data stored in the first storage device are damaged using a message authentication code. As still another example, the processing device 112 may generate a transportation service request for transporting the first storage device from a location of the first server 110 to a location of the second server 130 or a location of the terminal device 140 in response to a determination that the encrypted data stored in the first storage device are damaged. As still another example, the processing device 112 may transmit the encrypted data from the first storage device to the first server 110 in response to a determination that the encrypted data stored in the first storage device are not damaged. As still another example, the processing device 112 may verify whether the encrypted data are transmitted without flaw based on the message authentication code. As still another example, the processing device 112 may generate one or more metafiles associated with the encrypted data. As still another example, the processing device 112 may send a message to inform an operator to remove the first storage device from the first server 110. In some embodiments, the processing device 112 may include one or more processing engines (e.g., single-core processing engine(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the first server 110 may be a server set in an Internet Data Center (IDC). As used herein, a data center may refer to a dedicated space configured to house computer systems and associated components, such as telecommunication equipment and storage devices (e.g., the storage device 150). The DC may refer to a data center established by a service provider or DC company to provide stable and wide-band network services, high performance computing services, and/or hosting services. In some embodiments, the first server 110 may control or manage the operations of the computing device(s) and/or the storage device(s) in the IDC.

In some embodiments, the first server 110 may be connected to the network 120 to communicate with one or more components (e.g., the second server 130, the terminal device 140, the storage device 150) of the data transfer and storage system 100. In some embodiments, the first server 110 may be directly connected to or communicate with one or more components (e.g., the second server 130, the terminal device 140, the storage device 150) of the data transfer and storage system 100.

The network 120 may facilitate exchange of information and/or data. In some embodiments, one or more components (e.g., the first server 110, the second server 130, the terminal device 140, or the storage device 150) of the data transfer and storage system 100 may send information and/or data to other component(s) of the data transfer and storage system 100 via the network 120. For example, the terminal device 140 may transmit a message authentication code to the first server 110 and/or the second server 130 via the network 120. As another example, the processing device 112 may receive a message authentication code generated by the terminal device 140 via the network 120. As still another example, the terminal device 140 or the processing device 132 of the second server 130 may transmit encrypted data from a first storage device to the first server 110 via the network 120. As still another example, the processing device 112 may send a message to inform an operator to remove the first storage device from the first server 110 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (VVAN), a wireless local area network (VVLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the data transfer and storage system 100 may be connected to the network 120 to exchange data and/or information.

In some embodiments, the second server 130 may be a single server or a server group. The server group may be centralized or distributed (e.g., the second server 130 may be a distributed system). In some embodiments, the second server 130 may be local or remote. For example, the second server 130 may access information and/or data stored in the first server 110, the terminal device 140 and/or the storage device 150 via the network 120. As another example, the second server 130 may be directly connected to the first server 110, the terminal device 140 and/or the storage device 150 to access stored information and/or data. In some embodiments, the second server 130 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the second server 130 may be implemented on a computing device 200 including one or more components illustrated in FIG. 2 in the present disclosure.

In some embodiments, the second server 130 may include at least one processing device 132. The processing device 132 (also referred to as a second server processor) may process information and/or data generated by the terminal device 140 to perform one or more functions described in the present disclosure. For example, the processing device 132 may initialize a first storage device and a second storage device. As another example, the processing device 132 may encrypt the first storage device and/or the second storage device. As another example, the processing device 132 may decrypt the first storage device upon the first storage device being inserted into the second server 130. As a further example, the processing device 132 may determine whether encrypted data stored in the first storage device are damaged using a message authentication code. As still another example, the processing device 132 may recover the encrypted data in the first storage device based on data in the second storage device in response to a determination that the encrypted data stored in the first storage device are damaged. As still another example, the processing device 132 may transmit the encrypted data from the first storage device to the first server 110 in response to a determination that the encrypted data stored in the first storage device are not damaged. As still another example, the processing device 132 may verify whether the encrypted data are transmitted without flaw based on the message authentication code. As still another example, the processing device 132 may generate one or more metafiles associated with the encrypted data. As still another example, the processing device 132 may reset the first storage device and the second storage device. In some embodiments, the processing device 132 may include one or more processing engines (e.g., single-core processing engine(s) or multi-core processor(s)). Merely by way of example, the processing device 132 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the second server 130 may be connected to the network 120 to communicate with one or more components (e.g., the first server 110, the terminal device 140, the storage device 150) of the data transfer and storage system 100. In some embodiments, the second server 130 may be directly connected to or communicate with one or more components (e.g., the first server 110, the terminal device 140, the storage device 150) of the data transfer and storage system 100.

In some embodiments, the second server 130 may be located relatively far away from the first server 130, and relatively close to the terminal device 140. As used herein, "far away" may refer to that the distance between a location of the second server 130 and a location of the first sever 110 is larger than a first distance threshold. The first distance threshold may be, for example, 500 kilometers, 1000 kilometers, 1500 kilometers, 2000 kilometers, or any other suitable value. As used herein, "dose" may refer to that the distance between the location of the second server 130 and a location of the terminal device 140 is less than a second distance threshold. The second distance threshold may be, for example, 10 kilometers, 100 kilometers, 200 kilometers, or any other suitable value. In some embodiments, the second server 130 may be set at a test station of the terminal device 140.

The terminal device 140 may include a car 141, a bus 142, a truck 143, a train 144, a helicopter 145, an aircraft 146, a vessel 147, or the like, or any combination thereof. In some embodiments, the terminal device 140 may include an autonomous vehicle (e.g., an unmanned robot). The autonomous vehicle may be capable of sensing environmental information and navigating without human maneuvering. The terminal device 140 (e.g., the unmanned robot) may include structures of a conventional vehicle, for example, a chassis, a suspension, a steering device (e.g., a steering wheel), a brake device (e.g., a brake pedal), and an accelerator.

In some embodiments, the terminal device 140 (e.g., the unmanned robot) may also include a plurality of detection units configured to detect driving information associated with the terminal device 140. The plurality of detection units may include a camera, a global position system (GPS) module, an acceleration sensor (e.g., a piezoelectric sensor), a velocity sensor (e.g., a Hall sensor), a distance sensor (e.g., a radar, a LIDAR, an infrared sensor), a steering angle sensor (e.g., a tilt sensor), a traction-related sensor (e.g., a force sensor), or the like. In some embodiments, the driving information associated with the terminal deice 140 may include road condition information (e.g., a road width, a road length, a road type, a traffic sign, traffic lane information, traffic light information), map information, a state of the terminal device 140 during driving (e.g., a location of the terminal device 140, a velocity (e.g., an instantaneous velocity, an average velocity within a predetermined time period) of the terminal device 140, an acceleration (e.g., an instantaneous acceleration, an average acceleration within a predetermined time period) of the terminal device 140, a driving path of the terminal device 140, or the like, or any combination thereof.

In some embodiments, the terminal device 140 may further include at least one local server (also referred to as a device processor) integrated in the terminal device 140. For example, the local server may be a computing device (e.g., an onboard computer) installed in the terminal device 140. In some embodiments, the terminal device 140 may generate data associated with the driving information, and/or data associated with the performance or operation of the terminal device 140. In some embodiments, the terminal device 140 (i.e., the local server of the terminal device 140) may process the generated data to perform one or more functions described in the present disclosure. For example, the terminal device 140 may encrypt the generated data. As another example, after a first storage device and a second storage device are inserted into the terminal device 140, the terminal device 140 may decrypt the first storage device and the second storage device. As still another example, the terminal device 140 may store duplicated copies of the encrypted data respectively in the first storage device and the second storage device. As still another example, the terminal device 140 may generate a message authentication code associated with the encrypted data.

The storage device 150 may store data and/or instructions. In some embodiments, the storage device 150 may store data obtained from the terminal device 140, such as driving information associated with the terminal device 140 acquired by the plurality of detection units, performance or operation information of the terminal device 140. In some embodiments, the storage device 150 may store data and/or instructions that the first server 110 and/or the second server 130 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the first server 110, the second server 130, the terminal device 140) of the data transfer and storage system 100. One or more components of the data transfer and storage system 100 may access the data or instructions stored in the storage device 150 via the network 120. In some embodiments, the storage device 150 may be directly connected to or communicate with one or more components (e.g., the first server 110, the second server 130, and the terminal device 140) of the data transfer and storage system 100. In some embodiments, at least a portion of the storage device 150 may be part of the first server 110. In some embodiments, at least a portion of the storage device 150 may be integrated in the terminal device 140. In some embodiments, the storage device 150 may be set in the IDC. Merely for illustration, only one storage device is illustrated in the data transfer and storage system 100. However, it should be noted that the data transfer and storage system 100 in the present disclosure may also include multiple storage devices.

It should be noted that the data transfer and storage system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the data transfer and storage system 100 may further include a database (e.g., a Hadoop Distributed File System (HDFS)), an information source, or the like. The database may be configured to organize the data stored in the storage device 150 or an IDC, and facilitate the storage and retrieve of the data. As another example, the data transfer and storage system 100 may be implemented on other devices to realize similar or different functions. As still another example, the storage device 150 may be omitted from the data transfer and storage system 100.

In some embodiments, the data transfer and storage system 100 may further include (or communicate with) a data management system. In some embodiments, the data management system may be configured to manage data generated by the terminal device 140 and/or stored in the storage device 150 or an IDC. In some embodiments, the data management system may provide a data access interface for one or more users of the data, so that the user(s) may retrieve or download data of interest via the data management system for further use of the data. For example, an operator (e.g., an engineer) of the data transfer and storage system 100 may log in the data management system, filter, retrieve and/or download data and/or information stored in one or more storage devices of the data transfer and storage system 100. More descriptions of the data management system may be found elsewhere in the present disclosure.

Figure 2:
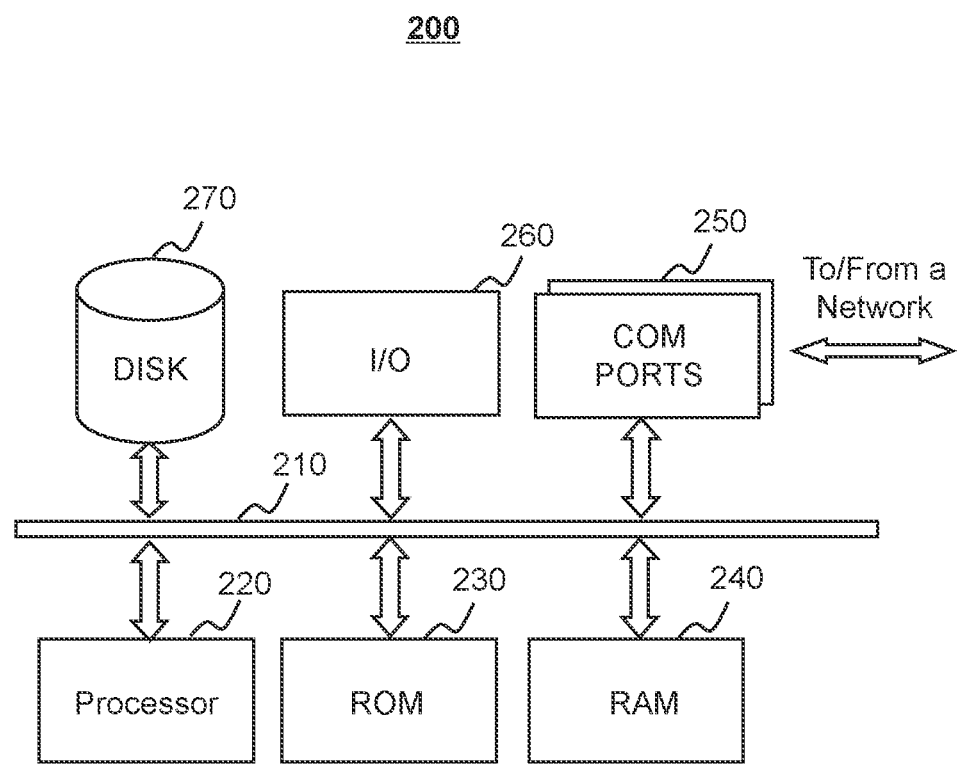
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the first server 110 and/or the second server 130 may be implemented on the computing device 200. For example, the processing device 112 and/or the processing device 132 may be implemented on the computing device 200 and configured to perform functions of the processing device 112 and/or the processing device 132 disclosed in this disclosure.

The computing device 200 may be used to implement any component of the data transfer and storage system 100 of the present disclosure. For example, the processing device 112 and/or the processing device 132 of the data transfer and storage system 100 may be implemented on the computing device 200, via its hardware, software program, firmware, or a combination thereof. Although only one such computer is shown for convenience, the computer functions related to the data transfer and storage system 100 as described herein may be implemented in a distributed manner on a number of similar platforms to distribute the processing load.

The computing device 200, for example, may include communication (COMM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
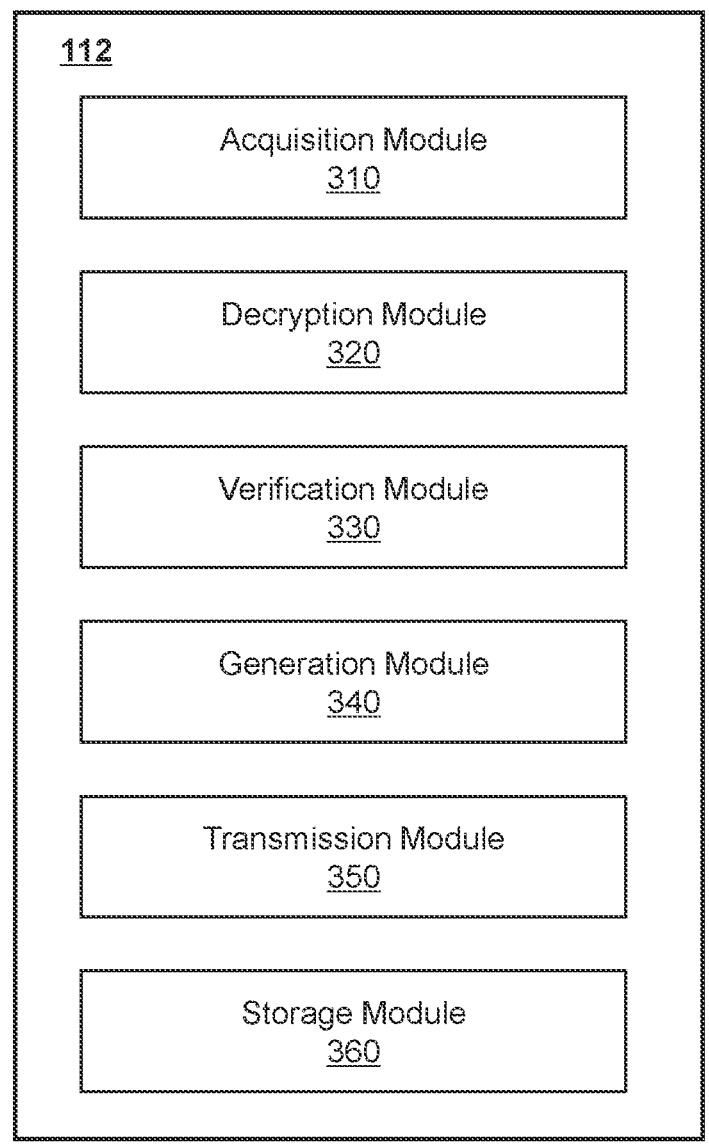
FIG. 3 is a block diagram illustrating an exemplary processing device according to some embodiments of the present disclosure.

FIG. 3 is a block diagram illustrating an exemplary processing device according to some embodiments of the present disclosure. The processing device 112 of the first server 110 may include an acquisition module 310, a decryption module 320, a verification module 330, a generation module 340, a transmission module 350, and a storage module 360.

The acquisition module 310 may be configured to obtain data and/or information associated with the data transfer and storage system 100. For example, the acquisition module 310 may receive a message authentication code (e.g., a Message Digest 5 (MD5) code) generated by the terminal device 140. In some embodiments, the acquisition module 310 may receive the message authentication code generated by the terminal device 140 via the network 120.

The decryption module 320 may be configured to decrypt one or more components of the data transfer and storage system 100, and/or data and/or information associated with the data transfer and storage system 100. For example, the decryption module 320 may decrypt a first storage device and/or a second storage device. As another example, the decryption module 320 may decrypt data stored in the first storage device and/or the second storage device.

The verification module 330 may be configured to verify information associated with the data transfer and storage system 100. For example, after a first storage device is transported to a location of the first server 110, upon the first storage device being inserted into the first server 110, the verification module 330 may determine whether (encrypted) data stored in the first storage device are damaged using a message authentication code. As another example, after the (encrypted) data are transmitted from the first storage device to the first server 110, the verification module 330 may verify whether the encrypted data are transmitted without flaw based on the message authentication code.

The generation module 340 may be configured to generate information associated with the data transfer and storage system 100. For example, the generation module 340 may generate a transportation service request for transporting a first storage device from a first location (e.g. a location of the first server 110) to a second location (e.g., a location of the second server 130, a location of the terminal device 140). As another example, the generation module 340 may generate one or more metafiles associated with (encrypted) data. As still another example, the generation module 340 may generate a message to inform an operator to remove the first storage device from the first server 1103. As still another example, the generation module 340 may generate a message to inform an operator to insert the first storage device into the first server 110.

The transmission module 350 may be configured to transmit data and/or information associated with the data transfer and storage system 100. For example, the transmission module 350 may transmit a transportation service request to a courier company. As another example, the transmission module 350 may transmit (encrypted) data from a first storage device to the first server 110 in response to a determination that (encrypted) data stored in the first storage device are not damaged. As still another example, the transmission module 350 may send a message to inform an operator to remove the first storage device from the first server 110. As still another example, the transmission module 350 may send a message to inform an operator to insert the first storage device into the first server 110.

The storage module 360 may be configured to store data and/or information associated with the data transfer and storage system 100. For example, the storage module 360 may store (encrypted) data in a Hadoop Distributed File System (HDFS). As another example, the storage module 360 may store the (encrypted) data in a storage device of the first server 110.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing device 112 may further include an initialization module (not shown) configured to initialize the first storage device and the second storage device.

Figure 4:
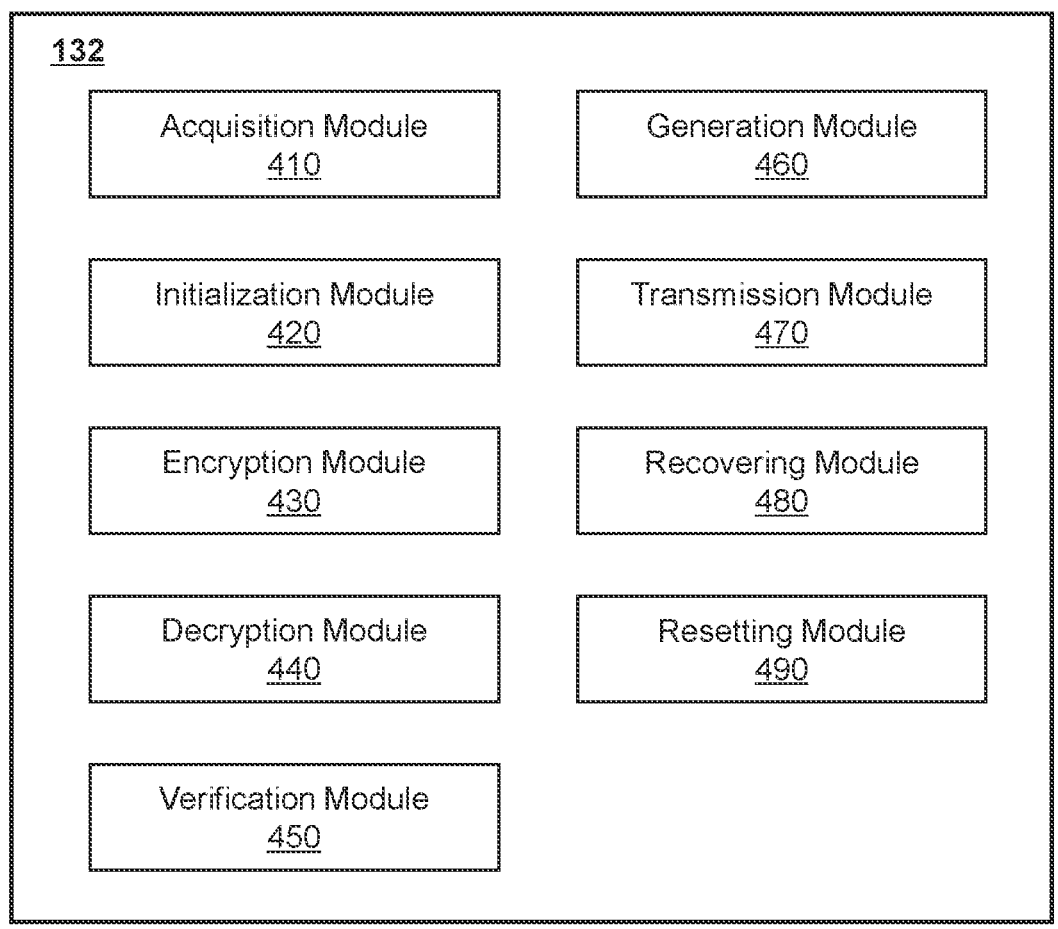
FIG. 4 is a block diagram illustrating an exemplary processing device according to some embodiments of the present disclosure.

FIG. 4 is a block diagram illustrating an exemplary processing device according to some embodiments of the present disclosure. The processing device 132 of the second server 130 may include an acquisition module 410, an initialization module 420, an encryption module 430, a decryption module 440, a verification module 450, a generation module 460, a transmission module 470, a recovering module 480, and a resetting module 490.

The acquisition module 410 may be configured to obtain data and/or information associated with the data transfer and storage system 100. For example, the acquisition module 410 may receive a message authentication code (e.g., a Message Digest 5 (MD5) code) generated by the terminal device 140. In some embodiments, the acquisition module 410 may receive the message authentication code generated by the terminal device 140 via the network 120.

The initialization module 420 may be configured to initialize one or more storage devices (e.g., a first storage device and/or a second storage device). In some embodiments, the initialization module 420 may configure the first storage device and the second storage device with a Redundant Array of Independent Disks (RAID) storage arrangement. For example, the initialization module 420 may configure the first storage device and the second storage device as a RAID-1 arrangement. In some embodiments, the initialization module 420 may generate two identification labels respectively associated with serial numbers of the first storage device and second storage device.

The encryption module 430 may be configured to encrypt one or more storage devices (e.g., a first storage device and/or a second storage device). For example, the encryption module 430 may encrypt the first storage device and/or the second storage device based on a cryptsetup tool. More descriptions of the encryption of the first storage device and the second storage device may be found elsewhere in the present disclosure (e.g., FIG. 7, and descriptions thereof).

The decryption module 440 may be configured to decrypt one or more components of the data transfer and storage system 100, and/or data and/or information associated with the data transfer and storage system 100. For example, the decryption module 440 may decrypt a first storage device and/or a second storage device. As another example, the decryption module 440 may decrypt data stored in the first storage device and/or the second storage device.

The verification module 450 may be configured to verify information associated with the data transfer and storage system 100. For example, after a first storage device is transported to a location of the second server 130, upon the first storage device being inserted into the second server 130, the verification module 450 may determine whether (encrypted) data stored in the first storage device are damaged using a message authentication code. As another example, after the (encrypted) data are transmitted from the first storage device to the first server 110, the verification module 450 may verify whether the encrypted data are transmitted without flaw based on the message authentication code.

The generation module 460 may be configured to generate information associated with the data transfer and storage system 100. For example, the generation module 460 may generate one or more metafiles associated with (encrypted) data.

The transmission module 470 may be configured to transmit data and/or information associated with the data transfer and storage system 100. For example, the transmission module 350 may transmit (encrypted) data from the first storage device to the first server 110 in response to a determination that the (encrypted) data stored in the first storage device are not damaged.

The recovering module 480 may be configured to recover (encrypted) data in the first storage device. In some embodiments, the recovering module 480 may recover the (encrypted) data in the first storage device based on data in the second storage device. In some embodiments, the recovering module 480 may be configured to recover or repair the first storage device and/or the second storage device. More descriptions of the recovery of the encrypted data in the first storage device may be found elsewhere in the present disclosure (e.g., FIG. 10, and descriptions thereof).

The resetting module 490 may reset one or more storage devices (e.g., a first storage device and/or a second storage device). In some embodiments, the resetting module 490 may reset the first storage device and/or the second storage device based on a script program written by an operator (e.g., an engineer). More descriptions of the reset of the first storage device and/or the second storage device may be found elsewhere in the present disclosure (e.g., FIG. 10, and descriptions thereof).

The modules in the processing device 132 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the initialization module 420 and the encryption module 430 may be combined as a single module which may both initialize and encrypt the first storage device and/or the second storage device. As another example, the verification module 450, the generation module 460, and/or the transmission module 470 may be omitted. As still another example, the initialization module 420 may be omitted. The first storage device and the second storage device may be initialized by the first server 110 and/or the terminal device 140. As still another example, the processing device 132 may further include a storage module (not shown) used to store information and/or data generated by the terminal device 140.

Figure 5:
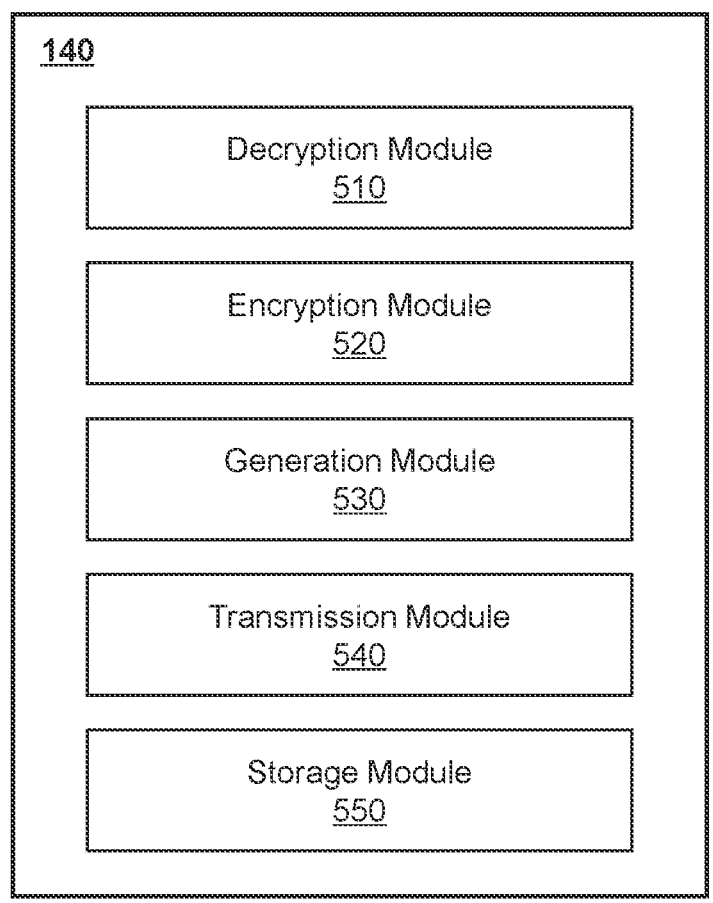
FIG. 5 is a block diagram illustrating an exemplary terminal device according to some embodiments of the present disclosure.

FIG. 5 is a block diagram illustrating an exemplary terminal device according to some embodiments of the present disclosure. The terminal device 140 may include a decryption module 510, an encryption module 520, a generation module 530, a transmission module 540, and a storage module 550.

The decryption module 510 may be configured to decrypt one or more storage devices (e.g., a first storage device and/or a second storage device). In some embodiments, the decryption module 510 may decrypt the first storage device and/or the second storage device by using a key. More descriptions of the decryption of the first storage device and/or the second storage device may be found elsewhere in the present disclosure (e.g., FIG. 8, and descriptions thereof).

The encryption module 520 may be configured to encrypt data/or information associated with the data transfer and storage system 100. For example, the encryption module 520 may encrypt data generated by the terminal device 140. In some embodiments, the encryption module 520 may encrypt the data generated by the terminal device 140 based on one or more encryption algorithms.

The generation module 530 may be configured to generate data and/or information associated with the data transfer and storage system 100. For example, the generation module 530 may generate data associated with the terminal device 140.

As another example, the generation module 530 may generate a message authentication code associated with (encrypted) data.

The transmission module 540 may be configured to transmit data and/or information associated with the data transfer and storage system 100. For example, the transmission module 540 may transmit a message authentication code to the first server 110 and/or the second server 130.

The storage module 550 may be configured to store data and/or information associated with the data transfer and storage system 100. For example, the storage module 550 may store duplicated copies of the encrypted data respectively in a first storage device and a second storage device that are removably inserted into the terminal device 140.

The modules in the terminal device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the terminal device 140 may further include an initialization module (not shown) used to initialize the first storage device and the second storage device.

Figure 6:
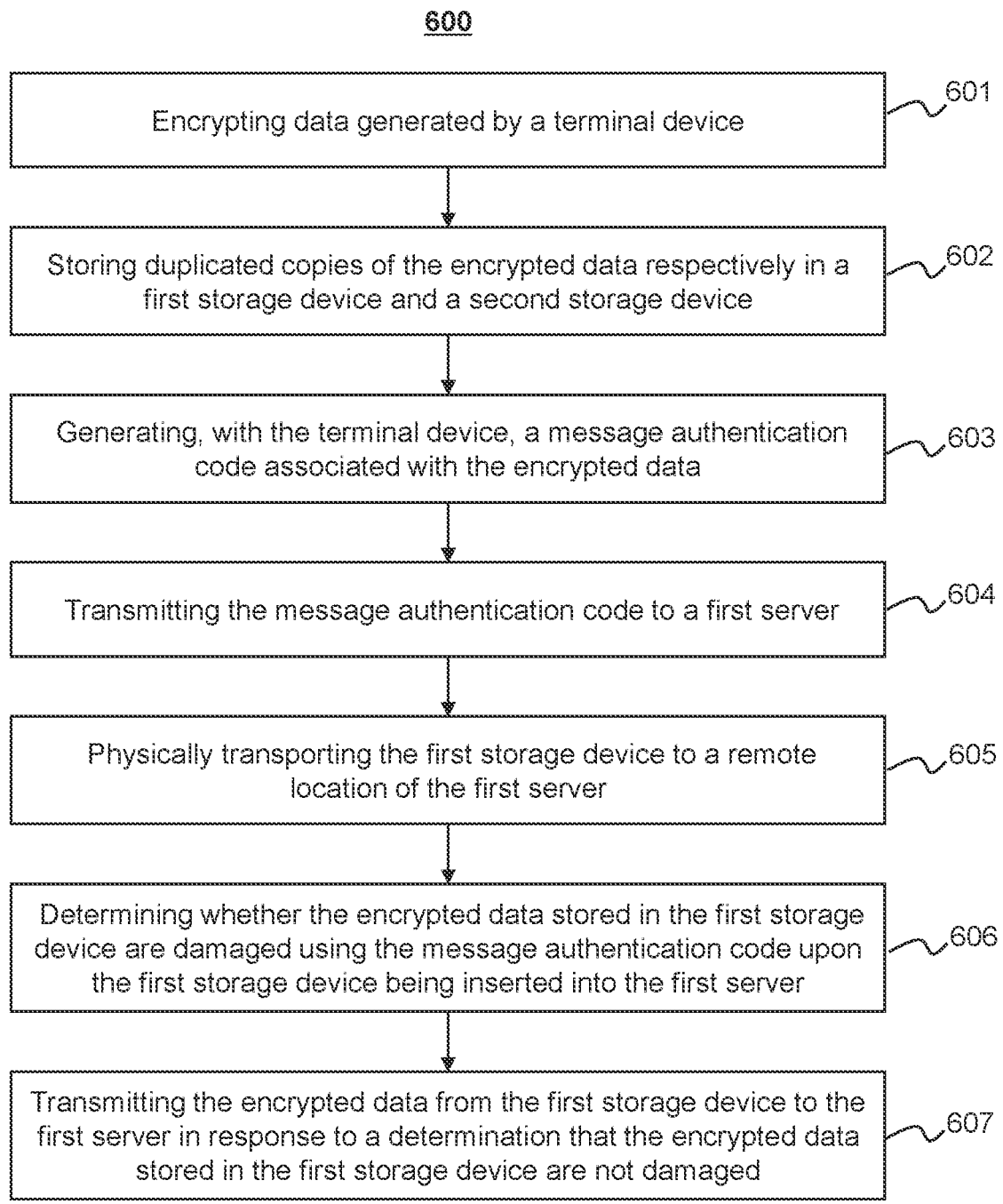
FIG. 6 is a flowchart illustrating an exemplary process for transmitting data generated by a terminal device from a first storage device to a server according to some embodiments of the present disclosure.

FIG. 6 is a flowchart illustrating an exemplary process for transmitting data generated by a terminal device from a first storage device to a server (or a storage device thereof) according to some embodiments of the present disclosure. The process 600 may be executed by the data transfer and storage system 100. For example, the process 600 may be implemented as a set of instructions stored in the storage ROM 230 or RAM 240. The processor 220 and/or the modules in FIGS. 3-5 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting.

In 601, the terminal device 140 (e.g., the encryption module 520) may encrypt data generated by the terminal device.

In some embodiments, the terminal device (e.g., the terminal device 140) may be an unmanned robot (e.g. autonomous vehicle). The data generated by the terminal device may include driving information associated with the terminal device. In some embodiments, the driving information associated with the terminal device may include road condition information (e.g., a road width, a road length, a road type, a traffic sign, traffic lane information, traffic light information), map information, a state (e.g., operation information, performance information) of the terminal device during driving (e.g., a location of the terminal device, a velocity (e.g., an instantaneous velocity, an average velocity within a predetermined time period) of the terminal device, an acceleration (e.g., an instantaneous acceleration, an average acceleration within a predetermined time period) of the terminal device, a driving path of the terminal device, or the like, or any combination thereof.

In some embodiments, the data generated by the terminal device may be in a format of bag files (or "bags"). As used herein, a bag may refer to a file format in a robot operating system (ROS) for storing ROS message data. ROS may refer to a robotics middleware (i.e., collection of software frameworks for robot software development). In some embodiments, one or more bags may be created by a bag tool (for example, rosbag) implemented on the terminal device 140.

As used herein, "data encryption" may refer to a process of transforming data (also referred to as "plaintext") into an encoded format (also referred to as "cipher text") that can only be read or processed after it's been decrypted. In some embodiments, the terminal device 140 may encrypt the data generated by the terminal device 140 based on one or more encryption algorithms. An exemplary encryption algorithm may include data encryption standard (DES) algorithm, public-key encryption algorithm, Blowfish algorithm, Twofish algorithm, advanced encryption standard algorithm, or the like.

In 602, the terminal device 140 (e.g., the storage module 550) may store duplicated copies of the encrypted data respectively in a first storage device and a second storage device.

The first storage device and the second storage device may include any storage medium capable of storing data. In some embodiments, the first storage device and/or the second storage device may include a mass storage, a removable storage, or the like, or any combination thereof. An exemplary mass storage may include a magnetic disk, an optical disk, a hard disk drive, a solid-state drive, or the like. An exemplary removable storage may include a flash drive, a floppy disk, an optical disk, a memory card, a zip disk, a magnetic tape, or the like.

In some embodiments, the first storage device and the second storage device may be installed (or inserted) in the terminal device 140. In some embodiments, the first storage device and the second storage device may be hard disks. During the driving of the terminal device 140, one or more components of the first storage device and/or the second storage device may be damaged due to collisions and/or bumps. For example, a head of a hard disk drive may be crashed if the hard disk drive is hit, dropped, or shaken, which may cause damage to the hard disks. In some embodiments, the first storage device and the second storage device may be solid state drives. The use of solid state drives may prevent or reduce storage device damage during the driving of the terminal device.

In some embodiments, the terminal device 140 may store the duplicated copies of the encrypted data respectively in the first storage device and the second storage device. In some embodiments, the terminal device 140 may store the duplicated copies of the encrypted data respectively in the first storage device and the second storage device by writing the duplicated copies of the encrypted data respectively in the first storage device and the second storage device. In some embodiments, the terminal device 140 may store the duplicated copies of the encrypted data respectively in the first storage device and the second storage device simultaneously or alternately, or in sequence.

In some embodiments, alternatively, the terminal device 140 may first store the data generated by the terminal device 140 in the first storage device and the second storage device, and then encrypt the data stored in the first storage device and the second storage device.

In 603, the terminal device 140 (e.g., the generation module 530) may generate a message authentication code associated with the encrypted data.

As used herein, the message authentication code may refer to a short piece of information used to authenticate a message (or data). In some embodiments, the message authentication code may be a message digest of the message (e.g., the encrypted data). The message authentication code may be used to verify that the message (e.g., the encrypted data) is come from a sender (i.e., the authenticity of the message) and has not been changed (i.e., the integrity of the message). That is, the message authentication code may guarantee the integrity and authenticity of the encrypted data. In some embodiments, the message authentication code may include a Message Digest 5 (MD5) code. As used herein, the MD5 code may be a 128-bit hash value associated with the encrypted data produced based on a hash function.

In 604, the terminal device 140 (e.g., the transmission module 540) may transmit the message authentication code to a first server (e.g., the first server 110). In some embodiments, the terminal device 140 may transmit the message authentication code to a processing device (e.g., the processing device 112) of the first server (e.g., the first server 110) via the network 120. In some embodiments, the terminal device 140 may also transmit the message authentication code to the second server 130.

In 605, the first storage device may be physically transported to a remote location of the first server (e.g., the first server 110). For example, the first storage device may be transported to the remote location of the first server through a land transportation (e.g., a rail transportation, a road transportation), an air transportation, a sea transportation, or the like, or any combination thereof. It is noted that, in some embodiments, the data stored in the first storage device may be transmitted to the first server without physical transportation of the first storage device. Physical transportation, however, in some cases, saves network resources, and possibly time.

As used herein, "remote" may refer to that the distance between a location of the terminal device 140 and a location of the first sever is larger than a distance threshold. The distance threshold may be, for example, 500 kilometers, 1000 kilometers, 1500 kilometers, 2000 kilometers, or any other suitable value. In some embodiments, being remote may mean that it would be efficient and/or cost-effective to request a transportation service, which can be provided by professional delivery service or by services designed for the task at hand.

In some embodiments, the terminal device 140, the processing device 112, or the processing device 132 may automatically generate a first transportation service request for transporting the first storage device to the remote location of the first server. The first transportation service request may be a request for a transportation service. Merely for illustration purposes, the transportation service may include a land transportation (e.g., a rail transportation, a road transportation), an air transportation, a sea transportation, or the like, or any combination thereof. In some embodiments, the first transportation service request may include a departure location, a destination, a start time, an estimated arrival time, or the like. The departure location may refer to a location where the transportation starts (e.g., the location of the terminal device 140 or the second server 130). The destination may refer to a location where the transportation ends (e.g., the location of the first server). The processing device 112 may submit the first transportation service request to a courier company. The courier company may transport the first storage device from the departure location (e.g., the location of the terminal device) to the destination (e.g., the location of the first server) based on the first transportation service request. In some embodiments, the first transportation service request may be initiated and/or submitted by an operator.

In 606, the processing device 112 (e.g., the verification module 330) may determine whether the encrypted data stored in the first storage device are damaged using the message authentication code upon the first storage device being inserted into the first server (e.g., the first server 110). In some embodiments, it would be possible to determine that whether the data in the first storage device are damaged by using other means, or simply by a failure to fully access such data after other possibilities (e.g., failure to decrypt) are ruled out.

In some embodiments, after the first storage device is transported to the location of the first server, an operator of the data transfer and storage system 100 may insert the first storage device into the first server. In some embodiments, due to unexpected circumstances (e.g., collisions, bumps, or the like), the first storage device may be damaged in the physical transportation process illustrated in 605, which may cause data damage of the first storage device. Therefore, in some embodiments, before transmitting the encrypted data from the first storage device to the first server, the processing device 112 may determine whether the encrypted data stored in the first storage device are damaged by verifying the message authentication code. For example, after the first storage device is inserted into the first server, the processing device 112 may generate a second MD5 code associated with the encrypted data stored in the first storage device. The processing device 112 may determine whether the encrypted data stored in the first storage device are damaged by comparing the second MD5 code and a first MD5 code associated with the encrypted data generated by the terminal device 140 as described in connection with operation 603 (e.g., the MD5 code received from the terminal device 140). In some embodiments, the processing device 112 may determine whether the second MD5 code associated with the encrypted data generated by the processing device 112 is the same as the first MD5 code associated with the encrypted data generated by the terminal device 140. In response to a determination that the second MD5 code is the same as the first MD5 code, the processing device 112 may determine that the encrypted data stored in the first storage device are not damaged. In response to a determination that the second MD5 code is different from the first MD5 code, the processing device 112 may determine that the encrypted data stored in the first storage device are damaged.

In 607, the processing device 112 (e.g., the transmission module 350) may transmit the encrypted data from the first storage device to the first server (e.g., the first server 110) in response to a determination that the encrypted data stored in the first storage device are not damaged. In some embodiments, the processing device 112 may directly transmit the encrypted data from the first storage device to the first server via one or more data cables connecting the first storage device and the first server. In some embodiments, the processing device 112 may transmit the encrypted data from the first storage device to the first server via the network 120. For example, the processing device 112 may transmit the encrypted data from the first storage device to the first server via a cable network. In some embodiments, the processing device 112 (e.g., the storage module 360) may store the encrypted data in one or more storage devices (e.g., the storage device 150). In some embodiments, the processing device 112 may organize the encrypted data in a Hadoop Distributed File System (HDFS). As used herein, a HDFS may refer to a distributed, scalable, and portable file system written in Java for the Hadoop framework.

In some embodiments, an operator (e.g., an engineer) of the data transfer and storage system 100 may retrieve and/or download the encrypted data stored in the HDFS via a data management system. For example, the operator of the data transfer and storage system 110 may log in the data management system. The login operator may further retrieve and/or download the encrypted data stored in the HDFS via a HDFS proxy of (or associated with) the data management system. As used herein, a HDFS proxy may refer to a protocol stored in the data management system. In some embodiments, the login operator may initiate a request for downloading a specific data file stored in the HDFS by, for example, selecting or confirming one or more options (e.g., action button(s), function menu(s), or the like) on an interface of the data management system. In some embodiments, the data management system may generate a uniform resource identifier (URI) (e.g., a uniform resource locator (URL)) based on one or more metafiles associated with the specific data file. The data management system may return the URI (e.g., a URL) based on the request. If the login operator clicks the URL, the data management system may invoke the HDFS proxy. The HDFS proxy may determine information associated with the specific data file (e.g., file type, file name, file location, file size, or the like) by resolving the URL. The HDFS proxy may retrieve the specific data file in the HDFS based on the information associated with the specific data file. Then the HDFS proxy may transmit the specific data file to the login operator. In some embodiments, the use of the HDFS proxy may ensure data security of the HDFS. As used herein, a URI may refer to a string of characters that unambiguously identifies a particular resource. As used herein, a URL (also referred to as a web address) may refer to a reference to a web resource that specifies its location on a computer network and a mechanism for retrieving it. The URL may be a specific type of URI.

In some embodiments, after the login operator initiates the request for downloading the specific data file stored in the HDFS, the data management system may encrypt an access path associated with the specific data file. As used herein, an access path may refer to a path chosen by a system (e.g., the data management system) to retrieve data (e.g., the specific data file) after a request is executed. In some embodiments, the data management system may encrypt the access path by using a timestamp. As used herein, a timestamp protocol may refer to a cryptographic protocol for certifying timestamps using, for example, X.509 certificates and public key infrastructure. For example, the data management system may determine a timestamp associated with the URL based on the time when the login operator initiates the request. The HDFS proxy may verify the timestamp associated with the URL based on the time when the login operator clicks the URL. That is, the URL may be valid until the timestamp expires. If the timestamp expires, that is, the URL is invalid, the request may be refused. If the timestamp does not expires, that is, the URL is valid, the HDFS proxy may retrieve the specific data file in the HDFS and transmit the specific data file to the login operator.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added elsewhere in the process 600. For example, a storing operation may be added after operation 607. In the storing operation, the processing device 112 (e.g., the storage module 360) may store the encrypted data in a storage device of (or associated with) the first server 110. As another example, an operation for verifying whether the encrypted data are transmitted without flaw based on the message authentication code may be added after operation 607. As still another example, an operation for sending a message to inform an operator to remove the first storage device from the first server may be added after operation 607. As still another example, an operation for automatically generating a second transportation service request for transporting the first storage device from the location of the first server to the location of the terminal device or the second server 130 may be added after operation 607. As still another example, an operation for resetting the first storage device and the second storage device with a second server (e.g., the second server 130) may be added after operation 607. As still another example, an operation for initializing the first storage device and the second storage device may be added before operation 601. More descriptions of the optional operations may be found elsewhere in the present disclosure (e.g., FIGS. 7-10, and descriptions thereof).

Figure 7:
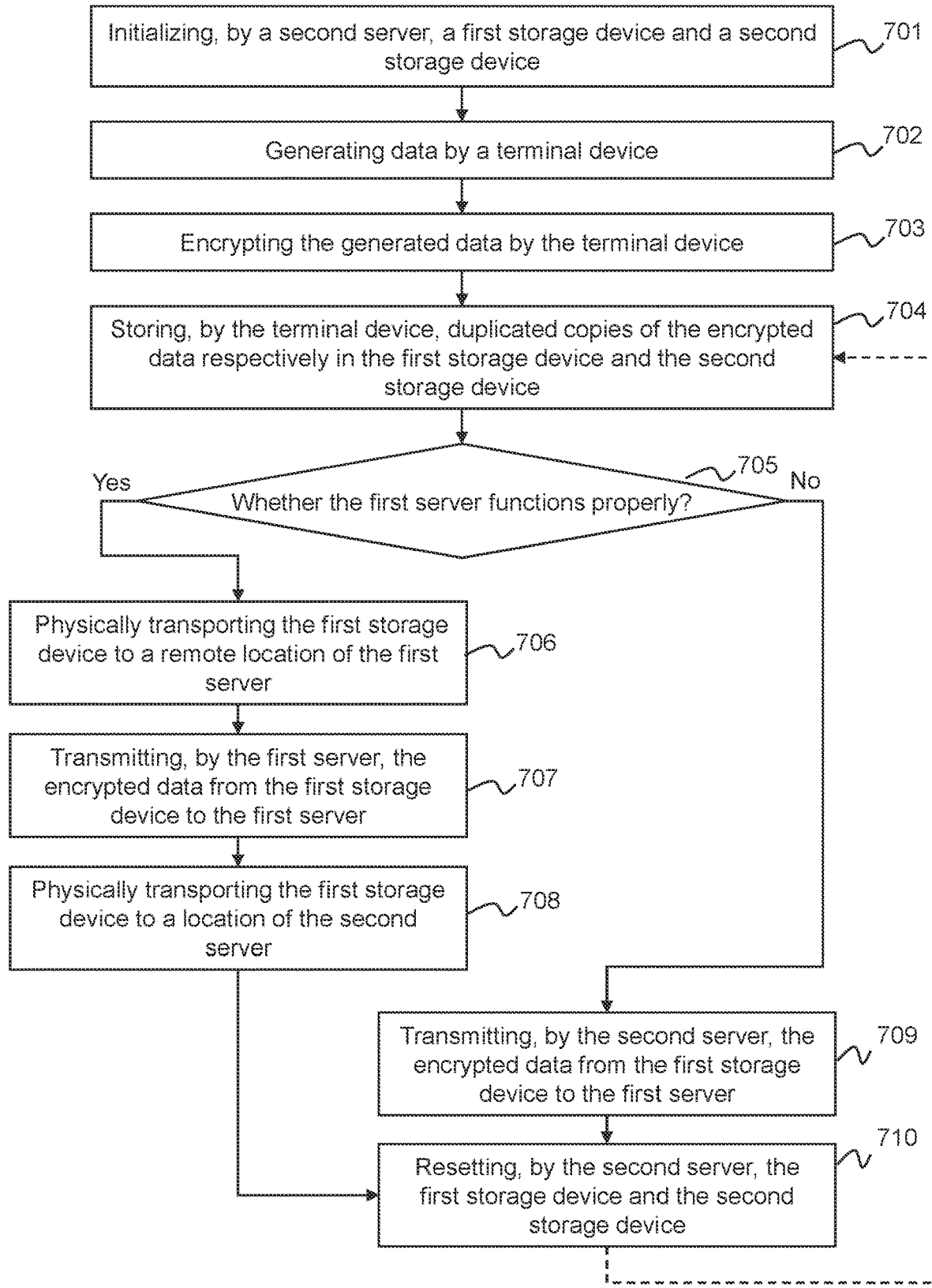
FIG. 7 is a flowchart illustrating an exemplary process for transmitting data generated by a terminal device from a first storage device to a server according to some embodiments of the present disclosure.

FIG. 7 is a flowchart illustrating an exemplary process for transmitting data generated by a terminal device from a first storage device to a server (or a storage device thereof) according to some embodiments of the present disclosure. The process 700 may be executed by the data transfer and storage system 100. For example, the process 700 may be implemented as a set of instructions stored in the storage ROM 230 or RAM 240. The processor 220 and/or the modules in FIGS. 3-5 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 illustrated in FIG. 7 and described below is not intended to be limiting.

In 701, the processing device 132 (e.g., the initialization module 420) of the second server 130 may initialize a first storage device and a second storage device. In some embodiments, the processing device 112 of the first server 110 may initialize the first storage device and the second storage device.

In some embodiments, the processing device 132 may encrypt the first storage device and the second storage device after the first storage device and the second storage device are inserted into the second server 130. As used herein, "encrypt a storage device" may refer to a process of encrypting every bit of data that goes on the storage device, including swap space, temporary files, and/or metadata (e.g., a directory structure, a file name, a modification timestamp or size). In some embodiments, the processing device 132 may encrypt the first storage device and the second storage device by using an encryption software or hardware. For example, the processing device 132 may encrypt the first storage device and the second storage device by using a transparent encryption algorithm. As used herein, "transparent encryption" (also referred to as a real-time encryption and an on-the-fly encryption) may refer to a process of automatically encrypting or decrypting data as it is loaded or saved on a storage device (e.g., the first storage device, the second storage device).

In some embodiments, the processing device 132 may encrypt the first storage device and/or the second storage device based on a cryptsetup tool. As used herein, the cryptsetup tool may refer to a command line tool for encrypting partitions in a storage device (e.g., the first storage device, the second storage device). After being encrypted by the cryptsetup tool, the first storage device and/or the second storage device cannot be recognized without using a key. As used herein, a key may refer to a piece of information (a parameter) that determines a functional output of a cryptographic algorithm (e.g., an encryption algorithm, a decryption algorithm).

In some embodiments, the processing device 132 may configure the first storage device and the second storage device with a Redundant Array of Independent Disks (RAID) storage arrangement. As used herein, a RAID may refer to a data storage virtualization technology that combines multiple physical disk drive components into one or more logical units for the purposes of data redundancy, performance improvement, or the like. In some embodiments, the processing device 132 may configure the first storage device and the second storage device as an RAID-1 arrangement. As used herein, an RAID-1 arrangement may generate an exact copy (or mirror) of a set of data on two or more storage devices.

In some embodiments, the processing device 132 may further generate two identification labels that are associated with serial numbers of the first storage device and second storage device respectively. As used herein, a serial number may refer to a unique number or string of characters that identifies a storage device (e.g., the first storage device, the second storage device). In some embodiments, an identification label may be associated with the serial number of the storage device (e.g., the first storage device, the second storage device). For example, each storage device (e.g., the first storage device, the second storage device) may have a unique identification label. The identification label may be set manually by an operator of the data transfer and storage system 100 or be determined by one or more components of the data transfer and storage system 100 based on one or more preset algorithms. In some embodiments, the identification label may be a string including one or more letters, one or more numbers, and/or one or more symbols. The identification label of the storage device (e.g., the first storage device, the second storage device) may be in any form, for example, "123", "A12B". In some embodiments, the identification labels of the first storage device and the second storage device may have a certain correlation, for example, the identification label of the first storage device may be "ID123A", while the identification label of the second storage device may be "ID123B", so that the data transfer and storage system 100 may recognize the RAID storage arrangement between the first storage device and the second storage device.

In some embodiments, after initializing the first storage device and the second storage device, the processing device 132 may record the identification labels associated with serial numbers of the initialized first storage device and the initialized second storage device in a data management system as described elsewhere in the present disclosure (e.g., the data management system described in FIG. 6).

In 702, the terminal device 140 (e.g., the generation module 530) may generate data. More descriptions of the generation of the data may be found elsewhere in the present disclosure (e.g., operation 601 in FIG. 6 and descriptions thereof).

In 703, the terminal device 140 (e.g., the encryption module 520) may encrypt the generated data. More descriptions of the encryption of the generated data may be found elsewhere in the present disclosure (e.g., operation 601 in FIG. 6 and descriptions thereof).

In 704, the terminal device (e.g., the storage module 550) may store duplicated copies of the encrypted data respectively in the first storage device and the second storage device. More descriptions of the storage of the duplicated copies of the encrypted data respectively in the first storage device and the second storage device may be found elsewhere in the present disclosure (e.g., operation 602 in FIG. 6 and descriptions thereof).

In 705, the processing device 112 (and/or the processing device 132, and/or an operator of the data transfer and storage system 100) may determine whether the first server (e.g., the first server 110) functions properly. For example, the processing device 112 may determine whether one or more components of the first server are functioning well. In response to a determination that the one or more components of the first server are functioning well, the processing device 112 may determine that the first server functions properly. In response to a determination that the one or more components of the first server are not functioning well (e.g., an IDC where the first server is located is suffering equipment failure, the first server is down, the first server is being upgraded, eta), the processing device 112 may determine that the first server does not function properly.

In response to a determination that the first server functions properly, process 700 may proceed to operation 706. In 706, the first storage device may be physically transported to a remote location of the first server (e.g., the first server 110).

In some embodiments, an operator of the data transfer and storage system 100 (e.g., an operator of the terminal device 140 or the second server 130) may record a first transportation service request for transporting the first storage device to the location of the first server in the data management system. After the first storage device is transported to the location of the first server, an operator of the first server may set the status of the transportation as "completed" in the data management system. More descriptions of the transportation of the first storage device to the remote location of the first server may be found elsewhere in the present disclosure (e.g., operation 605 in FIG. 6 and descriptions thereof).

In 707, the processing device 112 (e.g., the transmission module 350) may transmit the encrypted data from the first storage device to the first server (e.g., the first server 110). More descriptions of the transmission of the encrypted data from the first storage device to the first server may be found elsewhere in the present disclosure (e.g., operation 607 in FIG. 6 and descriptions thereof).

In 708, the first storage device may be physically transported to a location of the second server (e.g., the second server 130).

For example, the processing device 112 (e.g., the generation module 340) may automatically generate a second transportation service request for transporting the first storage device from the location of the first server to the location of the second server. In some embodiments, the processing device 112 may submit the second transportation service request to a courier company. In some embodiments, the courier company may transport the first storage device from the location of the first server to the location of the second server based on the second transportation service request.

In some embodiments, an operator of the first server may record the second transportation service request for transporting the first storage device to the location of the second server in the data management system. After the first storage device is transported to the location of the second server, an operator of the second server may set the status of the transportation as "completed" in the data management system.

In response to a determination that the first server is not function properly in 705, the process 700 may proceed to operation 709. In 709, the processing device 132 (e.g., the transmission module 470) may transmit the encrypted data from the first storage device to the first server. In some embodiments, the processing device 132 may transmit the encrypted data from the first storage device to the first server via the network 120. For example, the processing device 132 may transmit the encrypted data from the first storage device to the first server via a wireless network. In some embodiments, the transmission of the encrypted data from the first storage device to the first server using the second server may be slower than using the first server.

In 710, the processing device 132 (e.g., the resetting module 490) may reset the first storage device and the second storage device.

As used herein, "reset a storage device" may refer to a process of clearing the data stored in the storage device and/or bringing the storage device to its initial state (i.e., an initialized state obtained in 701). After the processing device 132 resets the first storage device and the second storage device, data stored on the first storage device and the second storage device may be removed. In some embodiments, the processing device 132 may reset the first storage device and the second storage device based on a script programmed by an operator (e.g., an engineer). As used herein, the script may be programmed using a programming language that supports script programs written for a special run-time environment that automate the execution of tasks that could alternatively be executed one-by-one by the operator.

Figure 8:
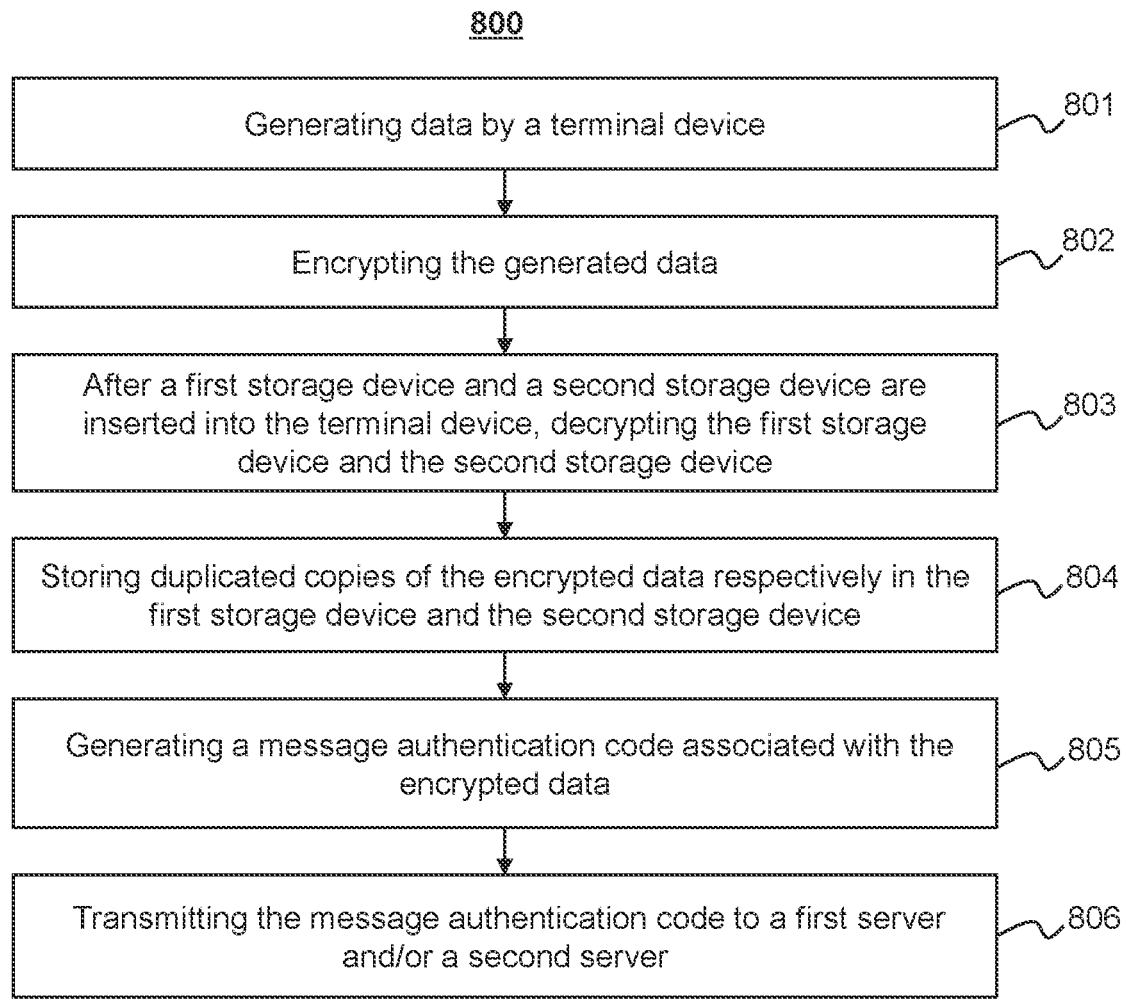
FIG. 8 is a flowchart illustrating an exemplary process for transmitting a message authentication code to a first server and/or a second server according to some embodiments of the present disclosure.
Figure 9:
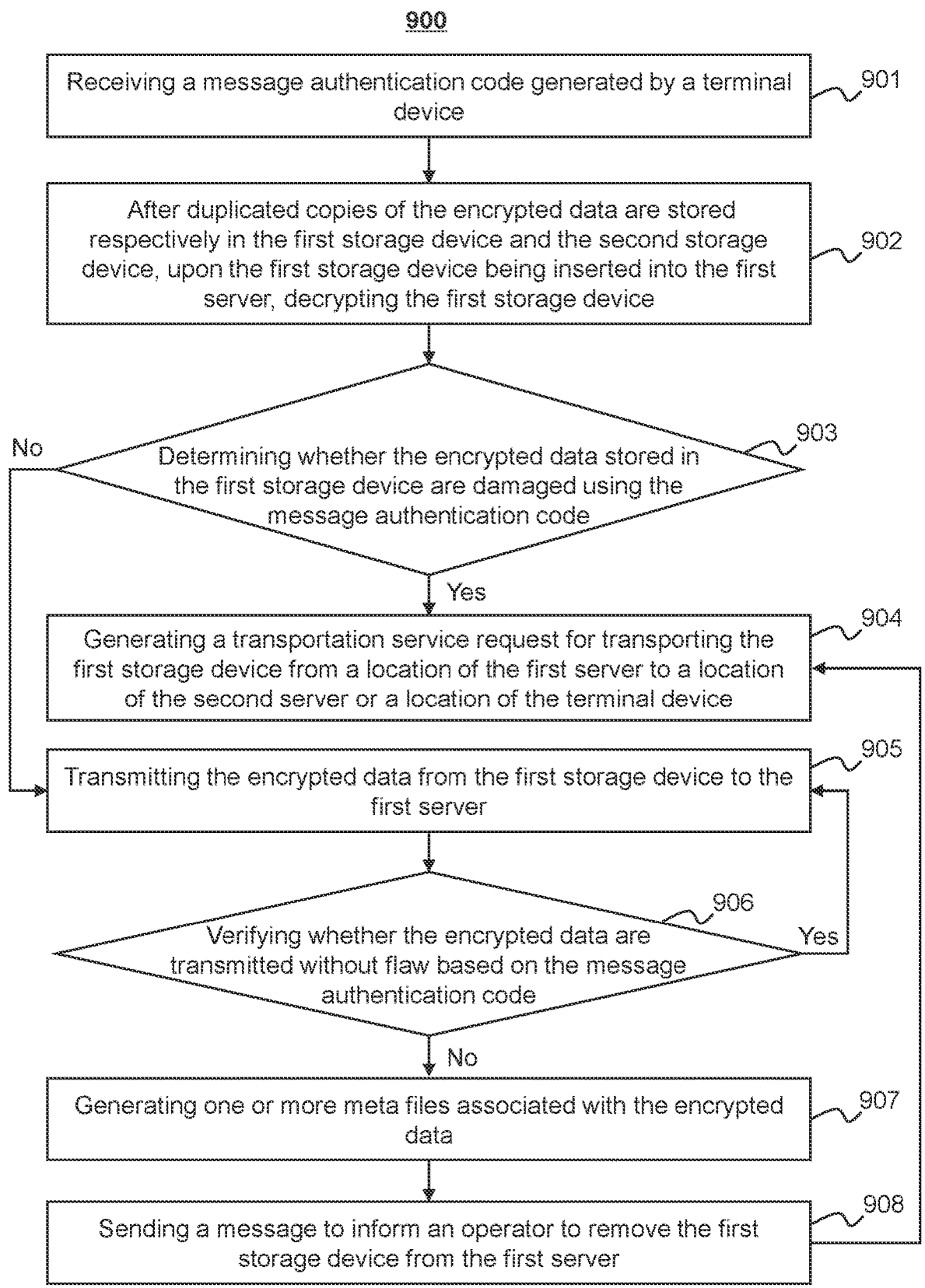
FIG. 9 is a flowchart illustrating an exemplary process for transmitting data generated by a terminal device from a first storage device to a server according to some embodiments of the present disclosure.
Figure 10:
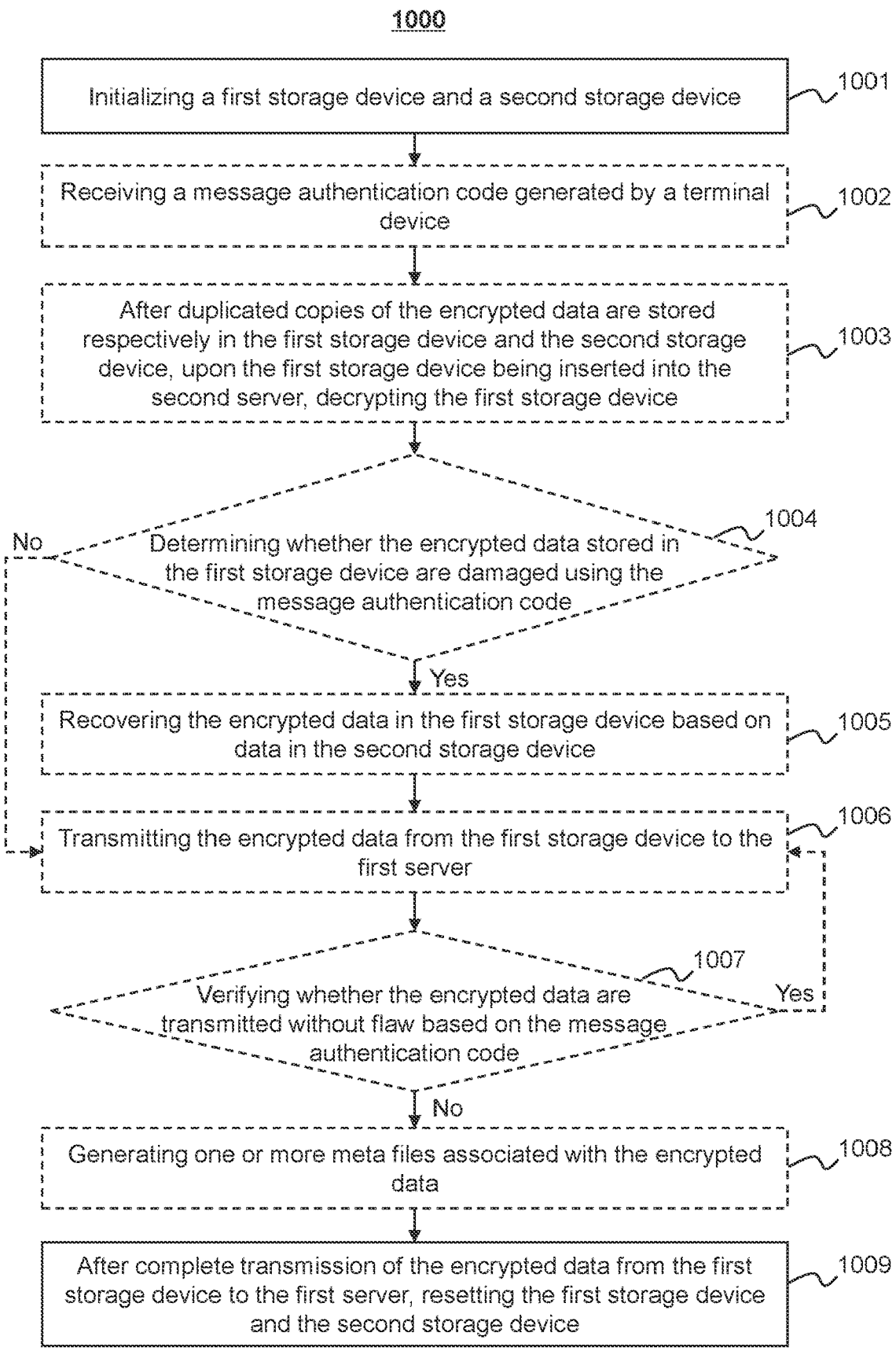
FIG. 10 is a flowchart illustrating an exemplary process for transmitting data generated by a terminal device from a first storage device to a server according to some embodiments of the present disclosure.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be performed by the terminal device 140, as illustrated in FIG. 8. In some embodiments, one or more additional operations may be performed by the first server 112, as illustrated in FIG. 9. In some embodiments, one or more additional operations may be performed by the second server 132, as illustrated in FIG. 10. In some embodiments, after operation 710, the first storage device and the second storage device may be further inserted into the terminal device 140, and duplicated copies of other encrypted data may be stored respectively in the first storage device and the second storage device.

FIG. 8 is a flowchart illustrating an exemplary process for transmitting a message authentication code to a first server and/or a second server according to some embodiments of the present disclosure. The process 800 may be executed by the terminal device 140 of the data transfer and storage system 100. For example, the process 800 may be implemented as a set of instructions stored in the storage ROM 230 or RAM 240. The processor 220 and/or the modules in FIG. 5 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 illustrated in FIG. 8 and described below is not intended to be limiting. In some embodiments, one or more operations of the process 800 may be performed in the process 700.

In 801, the terminal device 140 (e.g., the generation module 530) may generate data. More descriptions of the generation of the data may be found elsewhere in the present disclosure (e.g., operation 601 in FIG. 6, operation 702 in FIG. 7, and descriptions thereof).

In 802, the terminal device 140 (e.g., the encryption module 520) may encrypt the generated data. More descriptions of the encryption of the generated data may be found elsewhere in the present disclosure (e.g., operation 601 in FIG. 6, operation 703 in FIG. 7, and descriptions thereof).

In 803, after a first storage device and a second storage device are inserted into the terminal device 140, the terminal device 140 (e.g., the decryption module 510) may decrypt the first storage device and the second storage device.

In some embodiments, the terminal device 140 may decrypt the first storage device and the second storage device by using a key. As used herein, a key may refer to a piece of information (a parameter) that determines a functional output of a cryptographic algorithm (e.g., an encryption algorithm, a decryption algorithm). In some embodiments, the key may be obtained by the terminal device 140 from the second server 132 that encrypts the first storage device and the second storage device. In some embodiments, the key may be generated by the terminal device 140 based on an algorithm associated with the cryptsetup tool that the second server 130 uses to encrypt the first storage device and the second storage device. After being decrypted using the key, the first storage device and the second storage device may be mounted on the terminal device 140. Accordingly, the terminal device 140 may recognize the first storage device and the second storage device, data in the first storage device and the second storage device may be read by the terminal device 140, and (encrypted) data and/or files generated by the terminal device 140 may be written into the first storage device and/or the second storage device.

In 804, the terminal device 140 (e.g., the storage module 550) may store duplicated copies of the encrypted data respectively in the first storage device and the second storage device. More descriptions of the storage of the duplicated copies of the encrypted data respectively in the first storage device and the second storage device may be found elsewhere in the present disclosure (e.g., operation 602 in FIG. 6, operation 704 in FIG. 7, and descriptions thereof).

In 805, the terminal device 140 (e.g., the generation module 530) may generate a message authentication code associated with the encrypted data. More descriptions of the generation of the message authentication code associated with the encrypted data may be found elsewhere in the present disclosure (e.g., operation 603 in FIG. 6 and descriptions thereof).

In 806, the terminal device 140 (e.g., transmission module 540) may transmit the message authentication code to a first server and/or a second server. In some embodiments, the terminal device 140 may transmit the message authentication code to a processing device (e.g., the processing device 112) of the first server (e.g., the first server 110) and/or a processing device (e.g., the processing device 132) of the second server (e.g., the second server 130) via the network 120.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be performed simultaneously. For example, operation 801 and operation 802 may be performed simultaneously. In some embodiments, operation 803 may be performed before operations 801 and 802. In some embodiments, one or more operations may be omitted. For example, if the first storage device and the second storage device have not been encrypted, operation 803 may be omitted.

FIG. 9 is a flowchart illustrating an exemplary process for transmitting data generated by a terminal device from a first storage device to a server (or a storage device thereof) according to some embodiments of the present disclosure. The process 900 may be executed by the first server 110 of the data transfer and storage system 100. For example, the process 900 may be implemented as a set of instructions stored in the storage ROM 230 or RAM 240. The processor 220 and/or the modules in FIG. 3 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process 900 illustrated in FIG. 9 and described below is not intended to be limiting. In some embodiments, one or more operations of the process 900 may be performed in the process 700.

In 901, the processing device 112 (e.g., the acquisition module 310) may receive a message authentication code generated by a terminal device (e.g., the terminal device 140). In some embodiments, the processing device 112 may receive a first MD5 code generated by the terminal device 140 via the network 120.

In 902, after duplicated copies of the encrypted data are stored respectively in the first storage device and the second storage device, upon the first storage device being inserted into the first server, the processing device 112 (e.g., the decryption module 320) may decrypt the first storage device.

In some embodiments, after duplicated copies of the encrypted data are stored respectively in the first storage device and the second storage device, the first storage device may be removed from the terminal device 140, and physically transported to a location of the first server. In some embodiments, after the first storage device is physically transported to the location of the first server, the first storage device may be inserted into the first server by an operator of the data transfer and storage system 100. In some embodiments, the processing device 112 may decrypt the first storage device by using a key as described elsewhere in the present disclosure. In some embodiments, the key may be obtained by the processing device 112 from the second server 130 that encrypts the first storage device. In some embodiments, the key may be generated by the processing device 112 based on an algorithm associated with the cryptsetup tool that the second server 132 uses to encrypt the first storage device. After being decrypted by the key, the first storage device may be mounted on the first server. Accordingly, the processing device 112 may recognize the first storage device, data in the first storage device may be read by the processing device 112 (i.e., (encrypted) data and/or files stored on the first storage device may be accessible by the processing device 112).

In 903, the processing device 112 (e.g., the verification module 330) may determine whether the encrypted data stored in the first storage device are damaged using the message authentication code (i.e., the message authentication code received in 901).

For example, after the first storage device is inserted into the first server and/or is decrypted, the processing device 112 may generate a second MD5 code associated with the encrypted data. The processing device 112 may determine whether the encrypted data stored in the first storage device are damaged by comparing the second MD5 code and the first MD5 code. More descriptions for determining whether the encrypted data stored in the first storage device are damaged may be found elsewhere in the present disclosure (e.g., operation 606 in FIG. 6 and descriptions thereof).

In response to a determination that the encrypted data stored in the first storage device are damaged, process 900 may proceed to operation 904. In 904, the processing device 112 (e.g., the generation module 340) may generate a transportation service request for transporting the first storage device from the location of the first server (e.g., the first server 110) to a location of the second server (e.g., the second server 130) or a location of the terminal device (e.g., the terminal device 140).

For example, the processing device 112 may automatically generate a transportation service request for transporting the first storage device from the location of the first server to the location of the second server (or the location of the terminal device). The processing device 112 may submit the transportation service request to a courier company. The courier company may transport the first storage device from the location of the first server to the location of the second server (or the location of the terminal device) based on the transportation service request.

In response to a determination that the encrypted data stored in the first storage device are not damaged, process 900 may proceed to operation 905. In 905, the processing device 112 (e.g., the transmission module 350) may transmit the encrypted data from the first storage device to the first server. More descriptions of the transmission of the encrypted data may be found elsewhere in the present disclosure (e.g., operation 607 in FIG. 6, operation 707 in FIG. 7, and descriptions thereof).

In 906, the processing device 112 (e.g., the verification module 330) may verify whether the encrypted data are transmitted without flaw based on the message authentication code (i.e., the message authentication code received in 901).

In some embodiments, the processing device 112 may determine whether the encrypted data are transmitted without flaw by verifying the message authentication code. For example, after the encrypted data are transmitted from the first storage device to the first server, the processing device 112 may generate a third MD5 code associated with the encrypted data. The processing device 112 may verify whether the encrypted data are transmitted without flaw by comparing the third MD5 code and the first MD5 code. The processing device 112 may determine whether the third MD5 code associated with the encrypted data transmitted to the first server is the same as the first MD5 code associated with the encrypted data generated by the terminal device 140. In response to a determination that the third MD5 code is the same as the first MD5 code, the processing device 112 may determine that the encrypted data are transmitted from the first storage device to the first server without flaw. In response to a determination that the third MD5 code is not the same as the first MD5 code, the processing device 112 may determine that the encrypted data are transmitted with flaw.

In some embodiments, in response to a determination that the encrypted data are transmitted with flaw, process 900 may return to operation 905 to transmit the encrypted data from the first storage device to the first server again. In some embodiments, the operations 905 through 906 may be repeated until the encrypted data are transmitted without flaw.

In response to a determination that the encrypted data are transmitted without flaw, process 900 may proceed to operation 907. In 907, the processing device 112 (e.g., the generation module 340) may generate one or more metafiles associated with the encrypted data.

As used herein, a metafile may refer to a file that describes or specifies one or more other files. The metafile may contain metadata, which defines the other file(s) and gives a summary of what data the other file(s) contain. As used herein, metadata may refer to the data providing information about one or more aspects of the data of the other file(s). In some embodiments, the metadata may include mean(s) of creation of the data, purpose of the data, time and date of creation, creator or author of the data, location on a computer network where the data was created, standard(s) used, file size(s), data quality, source of the data, process used to create the data, or the like.

In 908, the processing device 112 (e.g., the transmission module 350) may send a message to inform an operator to remove the first storage device from the first server. The message may include an email, a text message, a voice message, etc.

After the processing device 112 sends the message, or the first storage device is removed from the first server, process 900 may proceed to operation 904 to generate a transportation service request for transporting the first storage device from the location of the first server to the location of the second server.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted. For example, operation 907 and/or operation 908 may be omitted. As another example, operation 902 may be omitted. In some embodiments, operation 908 may be performed before 907.

FIG. 10 is a flowchart illustrating an exemplary process for transmitting data generated by a terminal device from a first storage device to a server (or a storage device thereof) according to some embodiments of the present disclosure. The process 1000 may be executed by the second server 130 of the data transfer and storage system 100. For example, the process 1000 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process 1000 illustrated in FIG. 10 and described below is not intended to be limiting. In some embodiments, one or more operations of the process 1000 may be performed in the process 700.

In 1001, the processing device 132 (e.g., the initialization module 420) may initialize a first storage device and a second storage device. More descriptions of the initialization of the first storage and the second storage device may be found elsewhere in the present disclosure (e.g., operation 701 in FIG. 7, and descriptions thereof).

In 1002, the processing device 132 (e.g., the acquisition module 410) may receive a message authentication code generated by a terminal device (e.g., the terminal device 140). In some embodiments, the processing device 132 may receive a first MD5 code generated by the terminal device 140 via the network 120.

In 1003, after duplicated copies of the encrypted data are stored respectively in the first storage device and the second storage device, upon the first storage device being inserted into the second server, the processing device 132 (e.g., the decryption module 440) may decrypt the first storage device. In some embodiments, after duplicated copies of the encrypted data are stored respectively in the first storage device and the second storage device, the first storage device may be removed from the terminal device 140, and physically transported or transferred to a location of the second server. In some embodiments, after the first storage device is physically transported or transferred to the location of the second server, the first storage device may be inserted into the second server by an operator of the data transfer and storage system 100. In some embodiments, the processing device 132 may decrypt the first storage device by using a key as described elsewhere in the present disclosure. In some embodiments, the key may be generated by the processing device 132 based on an algorithm associated with the cryptsetup tool that the second server uses to encrypt the first storage device. After being decrypted by the key, the first storage device may be mounted on the second server. Accordingly, the processing device 132 may recognize the first storage device, data in the first storage device may be read by the processing device 132 (i.e., (encrypted) data and/or files stored on the first storage device may be accessible by the processing device 132).

In 1004, the processing device 132 (e.g., the verification module 450) may determine whether the encrypted data stored in the first storage device are damaged using the message authentication code (i.e., the message authentication code received in 1002). For example, after the first storage device is inserted into the second server and/or is decrypted, the processing device 132 may generate a fourth MD5 code associated with the encrypted data. The processing device 132 may determine whether the encrypted data stored in the first storage device are damaged by comparing the fourth MD5 code and the first MD5 code. In some embodiments, the processing device 132 may determine whether the fourth MD5 code generated by the processing device 132 is the same as the first MD5 code generated by the terminal device 140. In response to a determination that the fourth MD5 code is the same as the first MD5 code, the processing device 132 may determine that the encrypted data stored in the first storage device are not damaged. In response to a determination that the fourth MD5 code is different from the first MD5 code, the processing device 132 may determine that the encrypted data stored in the first storage device are damaged.

In response to a determination that the encrypted data stored in the first storage device are damaged, process 1000 may proceed to operation 1005. In 1005, the processing device 132 (e.g., the recovering module 480) may recover the encrypted data in the first storage device based on data in the second storage device.

As used herein, "data recovery" may refer to a process of salvaging (or retrieving) inaccessible, lost, corrupted, damaged or formatted data if the data cannot be accessed in a normal way. In some embodiments, the processing device 132 may recover the encrypted data in the first storage device based on one or more recovery software algorithms. In some embodiments, because duplicated copies of the encrypted data are stored respectively in the first storage device and the second storage device, the processing device 132 may obtain data (and/or files) in the second storage device corresponding to the damage data (and/or files) in the first storage device, so that the processing device 132 may repair the damage data and/or files.

In some embodiments, the processing device 132 may repair the first storage device. For example, the processing device 132 may image the drive of the first storage device to a new drive or a disk image file. In some embodiments, the processing device 132 may logically recover files, partition, master boot record (MBR), and/or filesystem structures of the first storage device. In some embodiments, after the processing device 132 recovers the encrypted data in the first storage device and/or the first storage device, the first storage device may be physically transported to a location of the first server (e.g., the first server 110), so that the processing device 112 may transmit the recovered (and/or encrypted) data from the first storage device to the first server. In some embodiments, after the processing device 132 recovers the encrypted data in the first storage device and/or the first storage device, the first storage device may not be physically transported to a location of the first server (e.g., the first server 110), so that the processing device 132 may transmit the recovered (and/or encrypted) data from the first storage device to the first server (e.g., via the network 120).

In response to a determination that the encrypted data stored in the first storage device are not damaged, process 1000 may proceed to operation 1006. In 1006, the processing device 132 (e.g., the transmission module 470) may transmit the encrypted data (or recovered encrypted data) from the first storage device to the first server (e.g., via the network 120). In some embodiments, if the encrypted data are transmitted to the first server, the first server (e.g., the processing device 112) may store the encrypted data in one or more storage devices (e.g., the storage device 150). More descriptions of the transmission of the encrypted data may be found elsewhere in the present disclosure (e.g., operation 709 in FIG. 7 and descriptions thereof).

In 1007, the processing device 132 (e.g., the verification module 450) may verify whether the encrypted data are transmitted without flaw based on the message authentication code (i.e., the message authentication code received in 1002).

In some embodiments, the processing device 132 may determine whether the encrypted data are transmitted without flaw by verifying the message authentication code. For example, after the encrypted data are transmitted from the first storage device to the first server, the processing device 112 may generate a fifth MD5 code associated with the encrypted data. The processing device 112 may transmit the fifth MD5 code to the processing device 132. The processing device 132 may verify whether the encrypted data are transmitted without flaw by comparing the fifth MD5 code and the first MD5 code. The processing device 132 may determine whether the fifth MD5 code associated with the encrypted data transmitted to the first server is the same as the first MD5 code associated with the encrypted data generated by the terminal device 140. In response to a determination that the fifth MD5 code is the same as the first MD5 code, the processing device 132 may determine that the encrypted data are transmitted from the first storage device to the first server without flaw. In response to a determination that the fifth MD5 code is not the same as the first MD5 code, the processing device 132 may determine that the encrypted data are transmitted with flaw.

In some embodiments, in response to a determination that the encrypted data are transmitted with flaw, process 1000 may return to operation 1006 to transmit the encrypted data from the first storage device to the first server again. In some embodiments, the operations 1006 through 1007 may be repeated until the encrypted data are transmitted without flaw.

In some embodiments, in response to a determination that the encrypted data are transmitted without flaw, process 1000 may proceed to operation 1008. In 1008, the processing device 132 (e.g., the generation module 460) may generate one or more metafiles associated with the encrypted data. More descriptions of the metafiles associated with the encrypted data may be found elsewhere in the present disclosure (e.g., operation 907 in FIG. 9, and descriptions thereof).

In 1009, after complete transmission of the encrypted data from the first storage device to the first server, the processing device 132 (e.g., the resetting module 490) may reset the first storage device and the second storage device. More descriptions of the resetting of the first storage device and the second storage device may be found elsewhere in the present disclosure (e.g., operation 710 in FIG. 7, and descriptions thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted. For example, operation 1002 through operation 1008 may be omitted. If the first server functions properly, the first storage device may be physically transported to the location of the first server, and operation 1002 through operation 1008 may be performed by the processing device 112 of the first server. If operation 1002 through operation 1008 are performed by the processing device 112 of the first server, after complete transmission of the encrypted data from the first storage device to the first server, and the encrypted data are transmitted without flaw, the first storage device may be physically transported from the location of the first server to the location of the second server, and then the processing device 132 may reset the first storage device and the second storage device. In some embodiments, in 1006, the processing device 132 may first transmit the encrypted data from the first storage device to the second server (e.g., via one or more data cables connecting the first storage device and the second server), and then transmit the encrypted data from the second server to the first server (e.g., via the network 120).

In some embodiments, one or more operations may be omitted from the process 600 through 1000. For example, the data stored in the first storage device and/or the second storage device may not be encrypted. In some embodiments, duplicated copies of data generated by a terminal device (e.g., the terminal device 140) may be stored respectively in a first storage device and a second storage device. The first storage device and the second storage device may be removably inserted into the terminal device. In some embodiments, the first storage device may be physically transported to a remote location of a first server (e.g., the first server 110). In some embodiments, if the first storage device is inserted into the first server, the processing device (e.g., the processing device 112) of the first server may decrypt the first storage device, and determine whether the data stored in the first storage device are damaged. In some embodiments, in response to a determination that the data stored in the first storage device are not damaged, the processing device of the first server may transmit the data from the first storage device to the first server.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for data transfer and storage, comprising:
   encrypting data generated by a terminal device;
   storing duplicated copies of the encrypted data respectively in a first storage device and a second storage device, which are removably inserted into the terminal device;
   generating, with the terminal device, a message authentication code associated with the encrypted data;
   transmitting the message authentication code to a first server;
   physically transporting the first storage device to a remote location of the first server,
   upon the first storage device being inserted into the first server,
      determining whether the encrypted data stored in the first storage device are damaged using the message authentication code;
      in response to a determination that the encrypted data stored in the first storage device are not damaged, transmitting the encrypted data from the first storage device to the first server; and
   initializing the first storage device and the second storage device, wherein the initializing includes:
      encrypting the first storage device and the second storage device;
      configuring the first storage device and second storage device with a Redundant Array of Independent Disks (RAID) storage arrangement; and
      generating two identification labels respectively associated with serial numbers of the first storage device and second storage device.

2. The method of claim 1, further comprising:
   decrypting the first storage device before determining whether the encrypted data stored in the first storage device are damaged.

3. The method of claim 1, further comprising:
   generating one or more metafiles associated with the encrypted data.

4. A system for data transfer and storage, comprising: a first server and a terminal device, wherein:
   the terminal device includes at least one device processor, wherein when executing a set of device instructions, the at least one device processor is directed to:
      encrypt data generated by the terminal device;
      store duplicated copies of the encrypted data respectively in a first storage device and a second storage device, which are removably inserted into the terminal device;
      generate a message authentication code associated with the encrypted data; and
      transmit the message authentication code to the first server; and
   the first server includes at least one first server processor, wherein when executing a set of first server instructions, the at least one first server processor is directed to:
      determine whether the encrypted data stored in the first storage device are damaged using the message authentication code, wherein the first storage device is physically transported to a remote location of the first server and inserted into the first server;
      in response to a determination that the encrypted data stored in the first storage device are not damaged, transmit the encrypted data from the first storage device to the first server; and
      the at least one first server processor is further directed to initialize the first storage device and the second storage device, or the system further comprises a second server, the second server including at least one second server processor, wherein when executing a set of second server instructions, the at least one second server processor is directed to initialize the first storage device and the second storage device; and
   wherein to initialize the first storage device and the second storage device, the at least one first server processor or the at least one second server processor is further directed to:
      encrypt the first storage device and the second storage device;
      configure the first storage device and second storage device with a Redundant Array of Independent Disks (RAID) storage arrangement; and
      generate two identification labels respectively associated with serial numbers of the first storage device and second storage device.

5. The system of claim 4, wherein the at least one first server processor is further directed to:
   decrypt the first storage device before determining whether the encrypted data stored in the first storage device are damaged.

6. The system of claim 4, wherein the at least one first server processor is further directed to:
   generate one or more metafiles associated with the encrypted data.

7. The system of claim 4, wherein the at least one device processor is further directed to:

automatically generate a first transportation service request for transporting the first storage device to the remote location of the first server.

8. The system of claim 4, wherein the at least one first server processor is further directed to:
automatically generate a second transportation service request for transporting the first storage device from the remote location of the first server to a location of the terminal device, wherein generating the second transportation service request is triggered by complete transmission of the encrypted data to the first server.

9. The system of claim 4, wherein the at least one first server processor is further directed to:
send a message to inform an operator to remove the first storage device from the first server.

10. The system of claim 4, wherein the at least one second server processor is further directed to:
after complete transmission of the encrypted data from the first storage device to the first server, reset the first storage device and the second storage device.

11. The system of claim 4, wherein the at least one first server processor is further directed to:
after complete transmission of the encrypted data from the first storage device to the first server, verify whether the encrypted data are transmitted without flaw based on the message authentication code.

12. The system of claim 4, wherein the message authentication code includes a Message Digest 5 (MD5) code.

13. The system of claim 4, wherein the terminal device is an unmanned robot.

14. A system for data transfer and storage, comprising: a first server and a terminal device, wherein:
the terminal device includes at least one device processor, wherein when executing a set of device instructions, the at least one device processor is directed to:
store duplicated copies of data generated by a terminal device respectively in a first storage device and a second storage device, which are removably inserted into the terminal device; and
the first server includes at least one first server processor, wherein when executing a set of first server instructions, the at least one first server processor is directed to:
decrypt the first storage device;
determine whether the data stored in the first storage device are damaged, wherein the first storage device is physically transported to a remote location of a first server and inserted into the first server;
in response to a determination that the data stored in the first storage device are not damaged, transmit the data from the first storage device to the first server; and
the at least one first server processor is further directed to initialize the first storage device and the second storage device, or the system further comprises a second server, the second server including at least one second server processor, wherein when executing a set of second server instructions, the at least one second server processor is directed to initialize the first storage device and the second storage device; and
wherein to initialize the first storage device and the second storage device, the at least one first server processor or the at least one second server processor is further directed to:
encrypt the first storage device and the second storage device;
configure the first storage device and second storage device with a Redundant Array of Independent Disks (RAID) storage arrangement; and
generate two identification labels respectively associated with serial numbers of the first storage device and second storage device.

15. The system of claim 14, wherein the at least one device processor is further directed to:
automatically generate a first transportation service request for transporting the first storage device to the remote location of the first server.

16. The system of claim 14, wherein the at least one first server processor is further directed to:
automatically generate a second transportation service request for transporting the first storage device from the remote location of the first server to a location of the terminal device.

17. The system of claim 16, wherein generating the second transportation service request is triggered by complete transmission of the data to the first server.

* * * * *